(12) United States Patent
Whitman

(10) Patent No.: US 12,618,210 B2
(45) Date of Patent: May 5, 2026

(54) SYSTEMS AND METHODS FOR LITTER COLLECTION AND REMOVAL

(71) Applicant: Jamey Whitman, Auburndale, FL (US)

(72) Inventor: Jamey Whitman, Auburndale, FL (US)

( * ) Notice: Subject to any disclaimer, the term of this patent is extended or adjusted under 35 U.S.C. 154(b) by 26 days.

(21) Appl. No.: 18/406,766

(22) Filed: Jan. 8, 2024

(65) Prior Publication Data
US 2024/0254704 A1 Aug. 1, 2024

Related U.S. Application Data

(60) Provisional application No. 63/437,617, filed on Jan. 6, 2023.

(51) Int. Cl.
| | |
|---|---|
| *E01H 1/04* | (2006.01) |
| *B60R 16/033* | (2006.01) |
| *E01H 12/00* | (2006.01) |

(52) U.S. Cl.
CPC ........... *E01H 1/045* (2013.01); *B60R 16/033* (2013.01); *E01H 1/047* (2013.01); *E01H 12/00* (2013.01)

(58) Field of Classification Search
None
See application file for complete search history.

(56) References Cited

FOREIGN PATENT DOCUMENTS

| | | | |
|---|---|---|---|
| AU | 1959792 A | * | 1/1993 |
| EP | 0582097 A2 | * | 2/1994 |

OTHER PUBLICATIONS

Google Patents translation of EP0582097A2 (Year: 2025).*

* cited by examiner

*Primary Examiner* — Eric W Golightly

(57) ABSTRACT
The present invention relates to an object collection apparatus with a support structure. An adjustable object engaging mechanism affixed to the front enables adaptation to diverse collection scenarios, while a configurable, durable collection receptacle at the rear accommodates various object sizes. A stepped transport conveyor system, powered by a motor, moves objects to the receptacle. An energy management system houses power generation and storage units, with an option for renewable energy sources. Operational parameters are managed via a control interface.

18 Claims, 9 Drawing Sheets

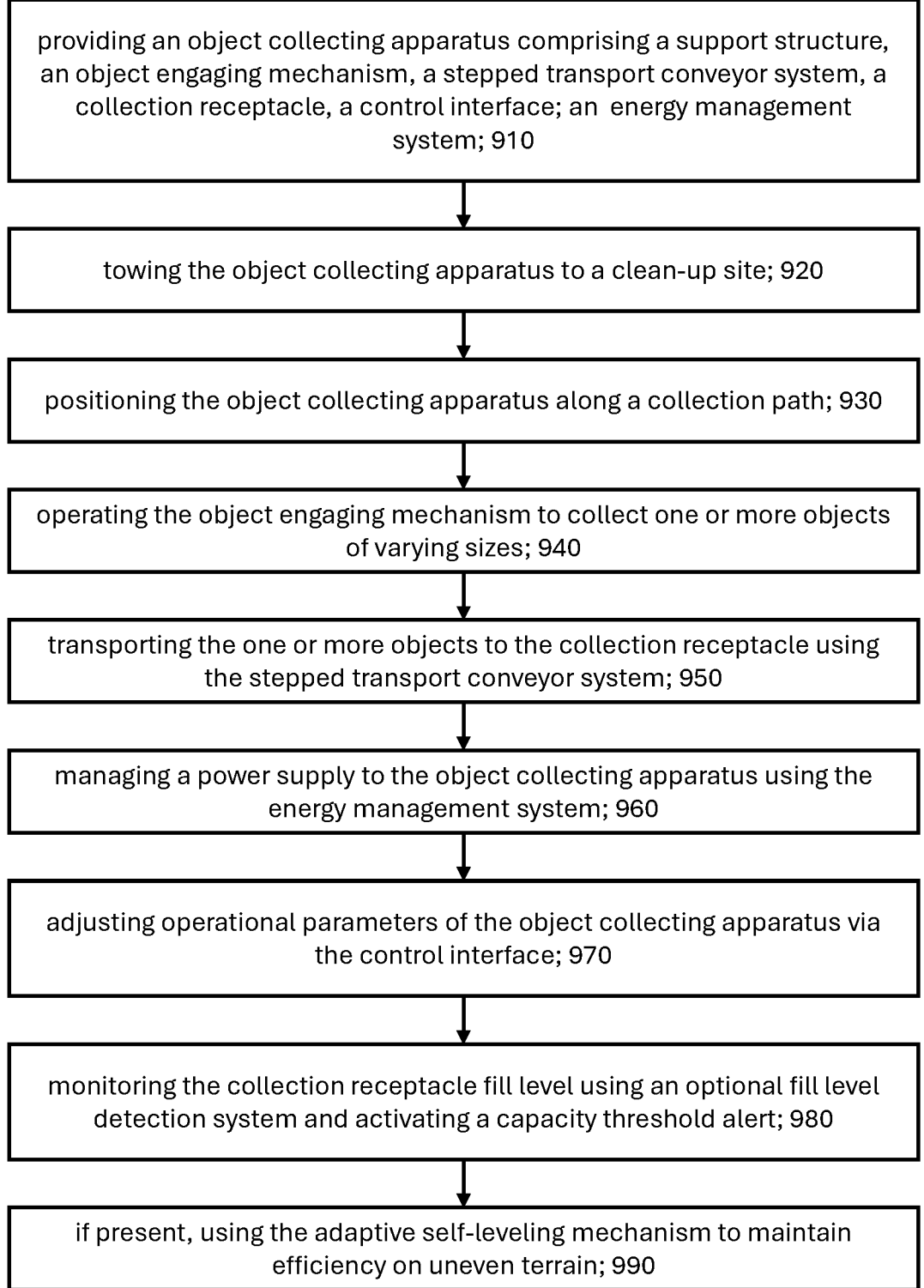

providing an object collecting apparatus comprising a support structure, an object engaging mechanism, a stepped transport conveyor system, a collection receptacle, a control interface; an energy management system; 910 towing the object collecting apparatus to a clean-up site; 920 positioning the object collecting apparatus along a collection path; 930 operating the object engaging mechanism to collect one or more objects of varying sizes; 940 transporting the one or more objects to the collection receptacle using the stepped transport conveyor system; 950 managing a power supply to the object collecting apparatus using the energy management system; 960 adjusting operational parameters of the object collecting apparatus via the control interface; 970 monitoring the collection receptacle fill level using an optional fill level detection system and activating a capacity threshold alert; 980 if present, using the adaptive self-leveling mechanism to maintain efficiency on uneven terrain; 990

FIG. 9

SYSTEMS AND METHODS FOR LITTER COLLECTION AND REMOVAL

REFERENCE TO RELATED APPLICATIONS

This application claims the benefit of U.S. Provisional Application No. 63/437,617, filed on Jan. 6, 2023, entitled "Litter Collector". This provisional application is incorporated in its entirety by reference.

FIELD OF THE INVENTION

The present disclosure pertains to the field of object collection apparatuses. Particularly, it relates to a highly versatile and efficient object collection apparatus designed to provide effective collection and management of various types of objects. More specifically, the object collection apparatus incorporates customizable object engaging mechanisms, energy management systems, and control interfaces to facilitate adaptive operation and collection capabilities.

BACKGROUND

The field of object collection apparatuses has seen various developments aimed at enhancing the efficiency and adaptability of collection mechanisms for different types of objects.

As technology has advanced, there has been a growing demand for object collection apparatuses that can effectively adapt to varying collection scenarios and surface conditions while maintaining operational reliability.

However, a common issue in the field of object collection apparatuses is the need for improved adaptability to different terrains and object types, as well as the challenge of efficient energy management for prolonged operation.

There exists a need for an effective and versatile object collection apparatus that can adapt to diverse operational environments, efficiently manage energy consumption, and provide reliable and customizable collection capabilities.

Moreover, the description herein of any disadvantages associated with the described products, methods, and/or apparatus, is not intended to limit the embodiments. Indeed, some aspects may include certain features of the described products, methods, and/or apparatus without suffering from their described disadvantages.

SUMMARY

In some aspects, the techniques described herein relate to an object collection apparatus including: (a) a support structure extending from a front end to a back end, the support structure including at least one of a composite material or a metal alloy, wherein any selected composite material or metal alloy exhibits characteristics of lightness and strength suitable for structural applications; (b) an object engaging mechanism operatively coupled to the support structure proximate to the front end, wherein the object engaging mechanism is configured to engage objects, and wherein the object engaging mechanism is adjustable in a plurality of configurations and orientations to adapt to various collection scenarios and surface conditions; (c) a collection receptacle operatively coupled to the back end of the support structure, wherein the collection receptacle includes a durable material, and wherein the collection receptacle is configurable in a plurality of capacities to accommodate holding varying object types and sizes, (d) a stepped transport conveyor system mounted to a middle portion of the support structure, wherein the stepped transport conveyor system is operable by a chain and sprocket system connected to a DC motor or alternatively by any other standard stepped transport conveyor system drive mechanism suitable for transferring motion to a stepped transport conveyor system and wherein the stepped transport conveyor system is configured to transport collected objects from the object engaging mechanism to the collection receptacle; (e) an energy management system housed within the support structure, the energy management system including at least one energy storage unit, wherein the energy management system optionally includes at least one renewable energy component; (f) a control interface operatively connected to the support structure, the control interface enabling adjustment of operational parameters of the object collection apparatus, including at least one of: speed settings, directional controls, or energy management, and further including mechanisms for lifting and emptying the collection receptacle; (g) an optional adaptive self-leveling mechanism integrated with the object collection apparatus, the adaptive self-leveling mechanism operative to adjust a position of at least one component of the object collection apparatus to maintain efficient operation on uneven terrain; (h) a fill level detection system operatively connected to the collection receptacle, wherein the fill level detection system is configured to detect when the collection receptacle reaches a predefined capacity threshold, and to activate an operator alert system; and (i) an operator alert system including a visual indicator, wherein the visual indicator is a flashing light that is activated by the fill level detection system upon the collection receptacle reaching the predefined capacity threshold, to signal a need for emptying the collection receptacle.

In some aspects, the techniques described herein relate to an object collection apparatus, wherein the composite material includes a reinforced matrix selected from carbon fiber, glass fiber, aramid fiber, and combinations thereof embedded in a resin matrix.

In some aspects, the techniques described herein relate to an object collection apparatus, wherein the metal alloy includes aluminum.

In some aspects, the techniques described herein relate to an object collection apparatus, wherein the durable material of the collection receptacle is a high-impact resistant material selected from high-density polyethylene (HDPE), acrylonitrile butadiene styrene (ABS), polycarbonate, steel, stainless steel, aluminum, and hardened plastics and composites that include these materials.

In some aspects, the techniques described herein relate to an object collection apparatus, wherein the collection receptacle is configurable in a plurality of capacities to accommodate different object types and sizes, the capacities ranging from approximately 1 cubic meter to approximately 7.5 cubic meters.

In some aspects, the techniques described herein relate to an object collection apparatus, wherein the object engaging mechanism includes one or more retrieval tines which are adjustable and include nylon and optionally including a coating for corrosion protection, wherein the one or more adjustable retrieval tines are capable of rotating in a forward direction and/or a reverse direction relative to a direction of travel of the object collection apparatus.

In some aspects, the techniques described herein relate to an object collection apparatus, wherein the energy management system includes one or more energy storage units configured as rechargeable battery sets, each of the battery sets being continually charged by a dedicated alternator during operation of the object collection apparatus, and further including a power inverter configured to convert direct current (DC) from the battery sets to alternating current (AC).

In some aspects, the techniques described herein relate to an object collection apparatus, wherein the energy management system includes a first energy storage unit dedicated to powering the object engaging mechanism and a second energy storage unit dedicated to powering a stepped transport conveyor system, with each of the first energy storage unit and the second energy storage unit including one or more rechargeable 12-volt batteries, and wherein each of the first energy storage unit and the second energy storage unit is charged by its respective alternator or a Power Take-Off (PTO) system integrated with a towing vehicle to facilitate continuous operation of the object collection apparatus.

In some aspects, the techniques described herein relate to an object collection apparatus, wherein the energy management system further optionally includes a solar panel array, the solar panel array being pivotally attached to the support structure to optimize solar energy capture, and is provided with a solar charge controller to manage the charging of the first energy storage unit and the second energy storage unit, thereby providing energy self-sufficiency for extended operational capability.

In some aspects, the techniques described herein relate to an object collection apparatus, wherein the solar panel array and the dedicated alternators are cooperatively managed by the energy management system to enhance charging efficiency and extend operational life of the first energy storage unit and the second energy storage unit, contributing to an uninterrupted runtime potential under varying operational and environmental conditions.

In some aspects, the techniques described herein relate to an object collection apparatus, wherein the support structure is further equipped with a towing assembly operatively connected thereto, the towing assembly including a trailer coupler configured for direct engagement with a trailer ball and ball mount of a transport vehicle, thereby facilitating on-road conveyance of the object collection apparatus to and from operational locations without the need for specialized transport equipment.

In some aspects, the techniques described herein relate to an object collection apparatus, wherein the support structure includes a towing mechanism enabling the object collection apparatus to perform litter collection operations while traveling at speeds up to 16 m/s (35 mph), and to be transported at highway speeds up to 38 m/s (85 mph) when not in operation mode.

In some aspects, the techniques described herein relate to an object collection apparatus, wherein the object collection apparatus is configured to be operable using a variety of power sources, including but not limited to 24 volts, 36 volts, 48 volts, 56 volts, and 60 volts.

In some aspects, the techniques described herein relate to an object collection apparatus, wherein the object engaging mechanism is adjustable and includes one or more adjustable retrieval tines configurable in various widths ranging from 2 feet to 8 feet to provide a selectable path width for collecting objects.

In some aspects, the techniques described herein relate to an object collection apparatus, further including a wireless communication module configured to support remote operation through communication protocols, including Bluetooth, Wi-Fi, and cellular networks.

In some aspects, the techniques described herein relate to an object collection apparatus, further including safety features including a bumper and regulated lighting for operation in compliance with applicable transportation standards, and wherein the collection receptacle is made of UV-resistant materials to enhance durability.

In some aspects, the techniques described herein relate to an object collection apparatus, further including an optional navigation system for autonomous or semi-autonomous guidance, the navigation system optionally utilizing at least one of GPS data, LIDAR sensors, or camera-based image recognition to facilitate object collection operations.

In some aspects, the techniques described herein relate to an object collection apparatus, further including a user interface including a touchscreen display and/or illumination elements mounted on the support structure to facilitate user interaction and safe operation in low-light conditions, wherein the illumination elements are in compliance with applicable safety regulations.

In some aspects, the techniques described herein relate to an object collection apparatus, wherein the control interface includes independent adjustment mechanisms for an operational speed and pitch of the stepped transport conveyor system and the object engaging mechanism, a dual-action mechanism for content evacuation from the collection receptacle, and a user interface including a touchscreen display, wherein said adjustments and evacuation operation are integrable with remote control functionalities provided by a mobile application.

In some aspects, the techniques described herein relate to a method for collecting objects utilizing an object collection apparatus, the method including: (a) providing an object collection apparatus; (b) towing the object collection apparatus to a clean-up site using any means of transport having a standard trailer hitch, ball mount, and trailer ball by attaching the object collection apparatus via a trailer coupler attached to the support structure; (c) positioning a support structure of the object collection apparatus to extend longitudinally from a front end to a back end along a collection path; (d) activating an adjustable object engaging mechanism mounted proximate to the front end of the support structure, wherein the object engaging mechanism is configured to adjust in multiple orientations relative to a surface to collect objects of varying types and sizes; (e) conveying the collected objects into a collection receptacle operatively coupled to the back end of the support structure, wherein the collection receptacle is formed from a high-impact resistant material and is adjustable in capacity; (f) managing energy consumption during an object collecting process by utilizing an energy management system housed within the support structure, wherein the energy management system includes one or more renewable energy components; (g) operating a control interface to adjust operational parameters of the object collection apparatus, including lifting and emptying the collection receptacle; (h) detecting when the collection receptacle fills to a certain capacity threshold using a fill level detection system, upon which the fill level detection system activates a notification protocol including a visual indicator with a flashing light to signal the need for emptying the collection receptacle; and (i) maintaining efficient operation on uneven terrain using an optional adaptive self-leveling mechanism integrated with the object collection apparatus.

BRIEF DESCRIPTION OF THE FIGURES

The drawings illustrate generally, by way of example, but not by way of limitation, various aspects discussed in the present document.

FIG. 9 shows a block diagram of a method of using the object collection apparatus.

DETAILED DESCRIPTION

As used herein, the terms "a" or "an" are used, as is common in patent documents, to include one or more than one independent of any other instances or usages of "at least one" or "one or more."

As used herein, the term "and/or" is meant to be both inclusive and exclusive, such that "A and/or B" includes "A but not B," "B but not A," and "A and B," unless otherwise indicated.

As used herein, the term "about" refers to an amount that is approximately, nearly, almost, or in the vicinity of being equal to or is equal to a stated amount.

References in the specification to "aspect" or "aspects" indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

As used herein, the term "trailer hitch" refers to a device attached to the chassis of a vehicle for towing. The term "trailer hitch" includes one or more of the hitch receiver, ball mount, hitch ball, hitch pin and optionally the hitch clip, safety chains, electrical connectors and/or hitch lock or any other components needed for operational use.

As used herein, the term "trailer towing assembly" refers to a device attached to the structure being towed to allow the structure to be towed. The term "trailer towing assembly" includes the trailer coupler and optionally safety chains, pin and clip mechanism, electrical connectors.

As used herein, the term "object collector" may refer to a litter collector device, apparatus, and/or system which may retrieve, remove, and/or dispose of litter or other objects such as those strewn aside a roadway, decomposing into $CO_2$ and polluting our environment.

Reference will now be made in detail to some aspects of the disclosed subject matter, examples of which are illustrated in the accompanying descriptions and figures. While the disclosed subject matter will be described in conjunction with the enumerated claims, it will be understood that they are not intended to limit the disclosed subject matter to those claims. On the contrary, the disclosed subject matter is intended to cover all alternatives, modifications and equivalents, which may be included within the scope of the presently disclosed subject matter as defined by the claims.

Figure 1:
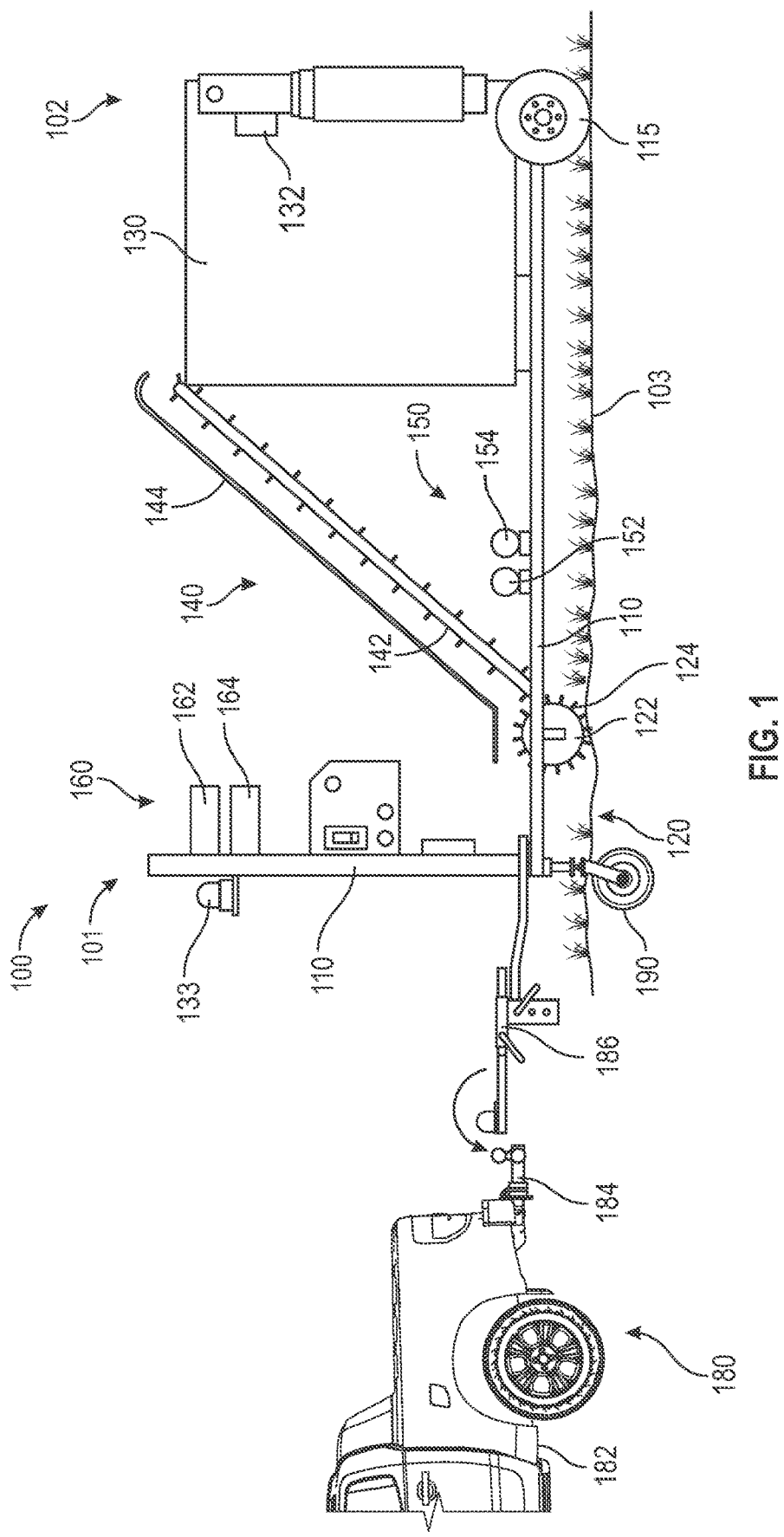
FIG. 1 shows a profile view of one embodiment of the object collection apparatus.

Referring now to the drawings, wherein the drawings are for purposes of illustrating some aspects of the present disclosure only, and not for purposes of limiting the same and wherein like reference numerals designate identical or corresponding parts throughout the several views, and referring particularly to FIG. 1, an exemplary object collection apparatus is depicted.

FIG. 1 provides a side view representation of an object collection apparatus 100 connected to a towing vehicle 182 via a trailer hitch 184 and a trailer towing assembly 186. The object collection apparatus 100 includes several components. In certain embodiments, the support structure 110 may extend from a front end 101 to a back end 102. In various aspects, the support structure 110 may provide the base for the object collection apparatus 100. In various embodiments the support structure 110 may include material that is characterized by lightness and strength. In other embodiments the material may be suitable for structural applications. In many aspects the material may be chosen to achieve a desirable combination of being characterized by lightness and strength. In various embodiments the material may include a composite material or a metal alloy. In various aspects the material may include but is not limited to advanced polymers, carbon fiber, titanium, and high-strength aluminum alloys. It is important to note that the specific materials mentioned are non-limiting examples, and the scope of the invention is not restricted to these materials. In various aspects, the object collection apparatus 100 may be composed of a composite material which includes a reinforced matrix including carbon fiber, glass fiber, aramid fiber, and combinations thereof embedded in a resin matrix.

In FIG. 1 the object collection apparatus 100 is shown on an object collection surface 103. In other aspects the object collection apparatus 100 may be adaptable to an object collection surface 103 including but not limited to asphalt, beaches, grasslands, and other similar environments where one or more objects 510 may require collection.

In the side view shown in FIG. 1, the support structure 110 of the object collection apparatus 100 is depicted as an L-shape comprising a horizontal element and a vertical element.

In various aspects the vertical element of the support structure 110 may include control and energy-related devices. In some aspects a visual indicator 133 may be integrated on and/or within the upper portion of the support structure 110. In some aspects an energy management system 160 may be housed on and/or within the support structure 110. In various embodiments the energy management system 160 may manage the power supply to the object collection apparatus 100. In several embodiments the energy management system 160 may optionally include a renewable energy component.

In some aspects the energy management system 160 may include a first energy storage unit 162 and a second energy storage unit 164. In several embodiments the first energy storage unit 162 and second energy storage unit 164 may be provided for the autonomous functioning of the apparatus.

FIG. 1 further depicts an object engaging mechanism 120 shown on the front end 101 of the object collection apparatus 100, coupled at or near the lower portion of the object collection apparatus 100. In various embodiments the object engaging mechanism 120 may be designed to engage with one or more objects 510. In various embodiments the object engaging mechanism 120 may be designed to collect the one or more objects 510 from various object collection surface 103. In various embodiments the object engaging mechanism 120 may be designed to collect the one or more objects 510 from various object collection scenarios and object collection surface 103 conditions.

In various embodiments the object engaging mechanism 120 may include a pickup drum 122. In some aspects the object engaging mechanism 120 may include one or more retrieval tines 124 operatively connected to the pickup drum 122. In certain embodiments the object engaging mechanism 120 including the pickup drum 122 and the one or more retrieval tines 124 may be connected to the support structure 110. In certain embodiments the pickup drum 122 may be a cylindrical component that may form a part of the object engaging mechanism 120 within the object collection apparatus 100. In many aspects the pickup drum 122 may rotate in a manner which causes the rotation of the one or more retrieval tines 124. In various embodiments the pickup drum 122 may be constructed from materials that balance durability and lightness. In various aspects the pickup drum 122 may be constructed from metals such as aluminum and/or composite materials. In several aspects the material chosen for the pickup drum 122 may provide lightness, strength, enhanced durability and reduced wear.

In some aspects the object engaging mechanism 120 may include one or more retrieval tines 124 operatively connected to the pickup drum 122. In some aspects the one or more retrieval tines 124 may be strategically positioned on the pickup drum 122 surface to engage with and collect one or more objects 510 from an object collection surface 103 including but not limited to grass, asphalt, sand or a combination thereof. In various aspects the one or more retrieval tines 124 may first dislodge and then capture debris from an object collection surface 103. In certain aspects, the one or more retrieval tines 124 may be designed to effectively dislodge, capture, and convey one or more objects 510 into the object collection apparatus 100, specifically the stepped transport conveyor system 140 discussed below, for subsequent collection and storage in the collection receptacle 130, also discussed below.

In certain aspects, the one or more retrieval tines 124 may be configured as elongated projections which may extend from the surface of the pickup drum 122. In various embodiments the one or more retrieval tines 124 design may facilitate efficient collection of the one or more objects 510 as the pickup drum 122 rotates during operation. In several embodiments the pickup drum 122 may be arranged in a pattern that maximizes their contact with the one or more objects 510 needing collection. In certain embodiments the one or more retrieval tines 124 may rotate in conjunction with the pickup drum 122 to collect one or more objects 510. In various aspects the one or more retrieval tines 124 may be arranged in a linear pattern parallel to the axis of the pickup drum 122. In some aspects the one or more retrieval tines 124 may be adjustable or replaceable. In other aspects one or more retrieval tines 124 is characterized by a lightness which allows the one or more retrieval tines 124 to pick up one or more objects 510. In several aspects the one or more retrieval tines 124 on the object engaging mechanism 120 may be configured so as to not push one or more objects 510 out of the way of the collection path. In various aspects, the object collection apparatus 100 may be configured such that the object engaging mechanism 120 may be adjustable and may include one or more adjustable retrieval tines 124 configurable in various widths ranging from 0.5 meters (1.64 feet) to 5 meters (16.4 feet) to provide a selectable path width for collecting objects.

In several embodiments the one or more retrieval tines 124 may be adapted for flexibility, strength and durability. In other aspects the one or more retrieval tines 124 may include natural fibers. In other aspects the one or more retrieval tines 124 may include synthetic fibers. In the 124 may include a combination of natural fibers and synthetic fibers. In several aspects the one or more retrieval tines 124 may include materials such as nylon, rubber, polyethylene, polypropylene, or other natural or synthetic polymers. In several aspects the one or more retrieval tines 124 may include stainless steel, metal alloys, carbon fiber, synthetic fibers. In various embodiments the one or more retrieval tines 124 may include a combination of materials such as polyethylene, polypropylene, other natural or synthetic polymers, stainless steel, carbon fiber, and/or synthetic fibers. In various aspects the one or more retrieval tines 124 may be made of nylon. In some configurations, metal tines may be used as a substitute for the collection brush as a means of collecting litter. In some aspects, the collection brush may run at a 7 mph average speed and 15 mph max speed. In some aspects, DC motors may be connected with a gearbox to power the brush system. In various aspects the one or more retrieval tines 124 may include metal spring tines for use in beaches and in taller grass.

In some aspects, the retrieval tines 124 may be coated with a corrosion-resistant material. In some aspects the one or more retrieval tines 124 may be coated with a powder coating. In various aspects the powder coating may be applied to enhance the durability and longevity of the one or more retrieval tines 124. In various aspects the powder coating may be applied to improve their resistance to environmental factors, thus ensuring the reliable performance of the retrieval tines system in diverse operational conditions. In various embodiments the one or more retrieval tines 124 may include surface treatments such as plating, anodizing, or chemical etching to create protective layers or barriers against corrosion, oxidation, or moisture intrusion. In various embodiments the one or more retrieval tines 124 may include protective encapsulation such as one or more polymers and/or resins, to shield it from direct exposure to environmental elements.

In various embodiments the one or more retrieval tines 124 may include sealants and/or coatings such as sealants, varnishes, or protective coatings designed to withstand specific environmental challenges, such as UV radiation, moisture, or chemical exposure. In various embodiments the one or more retrieval tines 124 may include additives such as corrosion inhibitors, UV stabilizers, or antioxidant additives into the material's composition to enhance its resistance to environmental degradation. In various embodiments the one or more retrieval tines 124 may include laminates and/or composite structures by combining the one or more retrieval tines 124 with protective layers or reinforcing elements to improve its overall durability and resilience.

The middle portion of the object collection apparatus 100 may include a stepped transport conveyor system 140. In certain embodiments the stepped transport conveyor system 140 may transport one or more objects 510 to a collection receptacle 130 on the back end 102 of the object collection apparatus 100. In some embodiments the stepped transport conveyor system 140 may include a stepped transport conveyor 142.

In many aspects, the stepped transport conveyor system 140 may be positioned at an incline within the object collection apparatus 100. In various embodiments, this incline may be oriented such that the lower end of the conveyor system commences at the front end 101 of the object collection apparatus 100 in proximity to the object engaging mechanism, specifically near the pickup drum 122 and retrieval tines 124 and may ascend upward towards the collection receptacle 130 at the back end 102 of the object collection apparatus 100. In certain aspects, the inclined arrangement of the stepped transport conveyor 142 may facilitate efficient transportation of collected one or more objects 510 from the point of retrieval on an object collection surface 103 to the collection receptacle 130. In some aspects, this inclination may be specifically designed to balance the gravitational forces and the mechanical motion imparted by the stepped transport conveyor system 140. In other aspects, the inclination angle may vary in different embodiments to accommodate varying sizes and types of collected objects, as well as to adapt to the physical dimensions of the apparatus.

In various embodiments, the structural configuration of the stepped transport conveyor system 140 may include features such as stepped and/or ridged and/or cleated surfaces. In certain aspects the stepped and/or ridged and/or cleated surfaces may prevent or substantially prevent the backflow or slippage of one or more objects 510 during their upward transit on the incline. In some aspects, these stepped and/or ridged and/or cleated surfaces may contribute to the movement of objects along the conveyor system, especially when operating on uneven or sloped terrain.

In several embodiments, the stepped transport conveyor system 140 of the object collection apparatus 100 may incorporate a chain and sprocket mechanism to facilitate the movement of the stepped transport conveyor 142. In certain aspects, this mechanism may include a series of sprockets interconnected by a chain, efficiently transferring power from the DC drive belt motor 154 to the stepped transport conveyor 142.

In various embodiments, the chain and sprocket mechanism may be specifically designed to enhance the reliability and stability of the stepped transport conveyor 142. In certain embodiments the chain and sprocket mechanism may provide minimal slippage and precise control of stepped transport conveyor 142 speed. In certain aspects reduced slippage and precision control of the stepped transport conveyor 142 may be important for the effective transportation of the collection of one or more objects 510. In some aspects, the robust nature of the chain and sprocket system may contribute to the overall durability of the stepped transport conveyor system 140, particularly in environments that demand high mechanical resilience. In some aspects, the power circuit may deliver 24 volts to the brush and 24 volts to the conveyor belt. In other aspects, the stepped transport conveyor 142 may be operated by a pulley and belt system.

In certain embodiments, the object collection apparatus 100 may incorporate a V-belt option as a part of its stepped transport conveyor system 140. The V-belt, a specific type of drive belt known for its V-shaped cross-section, may be utilized to efficiently transfer power from the motor to the conveyor mechanism. In this embodiment, the V-belt may provide enhanced grip and reduced slippage, ensuring consistent movement of the stepped transport conveyor system 140. In various aspects, the stepped transport conveyor system 140 may be stepped or cleated.

In several aspects the stepped transport conveyor system 140 may include a stepped transport conveyor cover 144. In various embodiments the stepped transport conveyor cover 144 may encase the stepped transport conveyor 142. In other aspects the stepped transport conveyor cover 144 may cover but not encase the stepped transport conveyor 142.

In several embodiments, the stepped transport conveyor cover 144 of the stepped transport conveyor system 140 may serve as a shield against debris and dust. In various aspects, the stepped transport conveyor cover 144 may protect the stepped transport conveyor system 140 from environmental elements. In some embodiments, the stepped transport conveyor cover 144 may act as a safety feature, preventing accidental contact with the moving parts of the conveyor system. In certain aspects, the design of the stepped transport conveyor cover 144 may include aerodynamic features to reduce drag and enhance energy efficiency.

In other aspects, the stepped transport conveyor cover 144 may integrate a solar panel array for supplemental energy. In many embodiments, the stepped transport conveyor cover 144 may include modular access panels for maintenance ease. In several embodiments, materials constituting the stepped transport conveyor cover 144 may reduce operational noise. Additionally, in some embodiments, the stepped transport conveyor cover 144 may offer customizable appearance options for aesthetic appeal and visibility. In various aspects, the stepped transport conveyor cover 144 may include features for thermal regulation, maintaining optimal operating temperatures for the conveyor system.

In some embodiments, the stepped transport conveyor cover 144 of the object collection apparatus 100 may be strategically positioned to aid in the successful transfer of one or more objects 510 onto the stepped transport conveyor system 142. Specifically, the stepped transport conveyor cover 144 may act as a deflector or guide, ensuring that objects dislodged or tossed into the air by the retrieval tines 124 of the object retrieval system 120 are directed onto the conveyor system 142 for transport to the collection receptacle 130. In various aspects, this configuration including the stepped transport conveyor cover 144 may prevent objects from being ejected outwardly or misdirected during the collection process.

In various aspects the DC drive drum motor 152 may be positioned within the object collection apparatus 100. In several embodiments, the DC drive drum motor 152 may be positioned on the support structure 110. In certain embodiments the DC drive drum motor 152 may be positioned below the stepped transport conveyor system 140. In other aspects the DC drive drum motor 152 may be positioned in other locations on the object collection apparatus 100. In various aspects, the DC drive drum motor 152 may provide power to the pickup drum 122. In certain aspects the DC drive drum motor 152 may be designed to provide the necessary torque and speed for the effective operation of the pickup drum.

In various aspects, the DC drive belt motor 154 may be positioned within the object collection apparatus 100. In several embodiments, the DC drive belt motor 154 may be positioned on the support structure 110. In certain embodiments, the DC drive belt motor 154 may be positioned below the stepped transport conveyor system 140. In other aspects, the DC drive belt motor 154 may be positioned in other locations on the object collection apparatus 100. In certain aspects, the DC drive belt motor 154 may be responsible for powering the stepped transport conveyor 142. This motor may be tailored to deliver the appropriate mechanical force required for the smooth and steady transportation of one or more objects 510 along the stepped transport conveyor system 140. In various aspects, both the DC drive drum motor 152 and the DC drive belt motor 154 may be optimized for energy efficiency and durability. In various aspects the DC drive belt motor 154 and DC drive drum motor 152 may require one or more gearboxes.

In various embodiments, as shown in FIG. 1, the collection receptacle 130 is positioned at the back end 102 of the object collection apparatus 100 and supported by the support structure 110. In several aspects the collection receptacle 130 may be used for storing and transporting one or more objects 510 which were collected.

In various embodiments, the stepped transport conveyor 142 of the stepped transport conveyor system 140 may transport collected one or more objects 510 toward the collection receptacle 130. In certain aspects, the stepped transport conveyor 142 may be inclined to facilitate upward movement of one or more objects 510 from the object engaging mechanism 120 toward the collection receptacle 130.

In several embodiments, when one or more objects 510 reach the terminus of the stepped transport conveyor 142, the one or more objects 510 may fall into the collection receptacle 130. In some aspects, the design of the stepped transport conveyor 142 may ensure that one or more objects 510 are deposited into the receptacle. In other aspects, the transition from the stepped transport conveyor 142 to the collection receptacle 130 may be optimized to prevent clogging or jamming. In various aspects the transition from the stepped transport conveyor 142 to the collection receptacle 130 may be designed to ensure a smooth and continuous flow of objects into the receptacle for storage.

In some aspects, the collection receptacle 130 may be constructed from materials such as natural polymers, synthetic polymers, composite materials, metals, or combinations thereof. In some aspects the collection receptacle 130 may be constructed from materials such as high-density polyethylene (HDPE), carbon fiber composites, stainless steel, reinforced plastics, or combinations thereof. In certain aspects, the collection receptacle 130 may be constructed from aluminum. In various aspects the collection receptacle 130 may be constructed from materials which provide corrosion resistance and ease of cleaning. In various aspects, the object collection apparatus 100 may be composed of a durable material of the collection receptacle 130 is a high-impact resistant material such as high-density polyethylene (HDPE), acrylonitrile butadiene styrene (ABS), polycarbonate, steel, stainless steel, aluminum, and hardened plastics and composites that include these materials.

In several embodiments, the collection receptacle 130 of the object collection apparatus 100 may include a fill level detection system 132. In certain aspects the fill level detection system 132 may be located in the interior of the collection receptacle 130. In other embodiments, the fill level detection system 132 may be mounted on the exterior of the collection receptacle 130. In various aspects the fill level detection system 132 may be designed to monitor the level of one or more objects 510 collected from the object engaging mechanism 120, transported using the stepped transport conveyor system 140 and housed within the collection receptacle 130. In various aspects, the fill level detection system 132 may determine when the collection receptacle 130 reaches a full or substantially full capacity. In certain aspects, upon detecting a full or substantially full capacity, the fill level detection system 132 may trigger a visual indicator 133, such as a flashing light. In certain aspects, the visual indicator 133 may serve to alert the operator. In various aspects the visual indicator 133 may serve to signal that the collection receptacle 130 requires emptying. In some embodiments, the visual indicator 133 may provide a signal to the driver of the towing vehicle 182 that the collection receptacle 130 requires emptying.

In several embodiments, the fill level detection system 132 may incorporate a pressure sensor strategically positioned within the collection receptacle 130. In several embodiments, the one or more objects 510 within the collection receptacle may accumulate and exert pressure directly on the base or the sides of the receptacle. In several aspects a pressure sensor that is part of the fill level detection system 132 may be integrated into the structure of the collection receptacle 130 to measure this exerted pressure. In various embodiments, the pressure sensor within the fill level detection system may activate an alert upon reaching a predetermined capacity threshold. In several aspects the alert may indicate the receptacle is at or near full capacity. In some aspects the alert may include a visual indicator 133. In other aspects the alert may include a signal to the control interface or to a mobile application informing the operator of the need to empty the receptacle. In many aspects the signal may be a visual or an auditory signal. In certain embodiments the fill level detection system 132 may allow continuous monitoring of the fill status without interrupting the collection of one or more objects 510 using the object collection apparatus 100.

In various aspects, the fill level detection system 132 might alternatively involve a photoelectric eye (Photo Eye) 210 sensor that emits an unbroken beam across the mouth of the collection receptacle 130. In certain embodiments the interruption of this beam by collected material at a certain height could signal that the receptacle 130 is near or at full capacity. In some embodiments this interruption may be detected and processed to cue the fill level detection system 132 to alert the operator through the visual indicator 133, or through a wireless signal to the mobile control application linked to the control interface 470. In various embodiments the fill level detection system 132 may be programmable to adapt to different environmental conditions and litter types.

In many embodiments, the collection receptacle 130 may vary in capacity and dimensions to accommodate different volumes and types of material collected. In various aspects the variations in capacity and/or dimensions may range from compact sizes suitable for smaller-scale operations to larger capacities intended for extensive material collection tasks. The adaptability in size and capacity may enhance the versatility of the object collection apparatus 100, making it suitable for a wide array of use cases, from urban environments to expansive natural landscapes.

In various aspects, the collection receptacle 130 of the object collection apparatus 100 may be designed with a flexible capacity to accommodate varying volumes of material and to accommodate different operational environments. The collection receptacle 130 may have a volume of approximately about 1 cubic meter (1.3 cubic yards) suitable for areas with lower amounts of litter. The collection receptacle 130 may have a volume of about 7.5 cubic meters (9.8 cubic yards) for high-density litter collection needs. The collection receptacle 130 may range in volume from approximately about 1, 2, 3, 4, 5, 6, 7, or approximately about 8 cubic meters. The collection receptacle 130 may range in volume from 1 or more, 2 or more, 3 or more, 4 or more, 5 or more, 6 or more, 7 or more, or 8 or more cubic meters.

In certain embodiments, the collection receptacle may incorporate features such as internal compartments for sorting collected objects, liners for ease of cleaning, and mechanisms for automated or assisted emptying. These features may contribute to the operational efficiency, ease of maintenance, and overall user-friendliness of the apparatus.

In various embodiments, the object collection apparatus 100 may include different wheel 115 configurations to support the support structure 110 and ensure mobility. In several aspects, the object collection apparatus 100 may be equipped with a wheel 115 positioned at the left-rear of the support structure 110, a wheel 115 at the right-rear of the support structure 110 and a jockey wheel 190 located under the front end 101 of the support structure 110. In various aspects this configuration may provide a balance between stability and maneuverability.

In some embodiments, the object collection apparatus 100 may include a wheel 115 positioned at each corner of the support structure 110. In various aspects this arrangement may offer enhanced stability, for example when the apparatus is used on uneven or rugged terrain.

In other embodiments, the object collection apparatus 100 may incorporate the configuration of a wheel 115 at each corner of the support structure 110 in addition to a jockey wheel 190 at the front end 101 of the support structure 110. In various aspects the inclusion of the jockey wheel 190 in this setup may enhance the stability and ease of maneuverability of the object collection apparatus 100, especially when detached from the towing vehicle 182. In various embodiments, the object collection apparatus 100 may be supported by a wheel 115 on each of the four corners of the object collection apparatus 100. The wheel 115 on each of the four corners of the object collection apparatus 100 may allow for utilization of the object collection apparatus 100 on an object collection surface 103 such as grass as well as transport on paved roads at highway speeds. In various embodiments, the object collection apparatus 100 may travel up to 38 m/s (85 mph).

Each of these wheel configurations may be selected based on the specific operational needs, terrain requirements, and the preferred balance between stability, mobility, and weight efficiency of the object collection apparatus 100.

In several embodiments, the object collection apparatus 100 may include a dual battery setup, including the first energy storage unit 162 and the second energy storage unit 164. In various aspects each battery set in these embodiments may be specifically configured to power distinct components of the apparatus. In other aspects one set may be dedicated to power the retrieval tines system. In certain embodiments the other set may be dedicated to power to the stepped transport conveyor system 140. In various aspects, the batteries may be of 12-volt units, collectively contributing to a 48-volt electric system within the apparatus. In various aspects, the batteries may collectively contribute to a variety of power sources including but not limited to 24 volt, 36 volt, 48 volt, 60 volt electric system within the apparatus.

In certain embodiments, the apparatus may incorporate two alternators, each associated with a respective set of batteries. In some aspects, these alternators may be responsible for continually recharging the batteries during the operation of the apparatus. This continuous recharging capability by the alternators may potentially enable the apparatus to run continuously, potentially 24/7, enhancing its operational efficiency.

In other aspects, the object collection apparatus 100 may undergo modifications to its drive system, such as a transition from a belt to a chain and sprocket mechanism for the stepped transport conveyor system. This change may necessitate a reconsideration of how the alternators are integrated into the system, ensuring that their functionality in recharging the batteries is not compromised. In many embodiments, the apparatus may utilize brushless DC motors for driving the retrieval tines and the stepped transport conveyor system, with the alternators ensuring a consistent power supply to these motors. In several aspects, the object collection apparatus 100 may incorporate DC motors which could be complemented with gearboxes to enhance their operational efficiency. In various aspects, the apparatus may utilize brushless DC (BLDC) shunt motors, specifically in the range of 0.5 horsepower (hp) to 1 hp. These motors may be selected for their balance of power and efficiency, suitable for the apparatus's functional requirements.

In several embodiments, the object collection apparatus 100 may include an energy management system 160 which includes a first energy storage unit (162) dedicated to powering the object engaging mechanism and a second energy storage unit (164) dedicated to powering a stepped transport conveyor system, with each of the first energy storage unit and the second energy storage unit including one or more rechargeable 12-volt batteries, and wherein each of the first energy storage unit 162 and the second energy storage unit 164 may be charged by its respective alternator or a Power Take-Off (PTO) system integrated with a towing vehicle 182 to facilitate continuous operation of the object collection apparatus.

In several embodiments, the electric system of the apparatus, including the batteries and alternators, may be designed to accommodate changes in power draw. For example, adjustments in the speed of the retrieval tines and stepped transport conveyor system, controlled through a knob or similar mechanism, may increase the electric current sent to the motors. In response, the alternators may compensate for this increased power draw by boosting the battery charging rate.

In several embodiments the first energy storage unit 162 and second energy storage unit 164 may be provide for the autonomous functioning of the apparatus. In several embodiments the first energy storage unit 162 and second energy storage unit 164 may be allow the object collection apparatus 100 to operate without the need to refuel. In various embodiments the first energy storage unit 162 and the second energy storage unit 164 may enable the object collection apparatus 100 to operate continuously. In certain aspects the energy management system 160 including the first energy storage unit 162 and the second energy storage unit 164 may enhance the operational efficiency of the object collection apparatus 100. This stands in contrast to current devices which rely on hydraulic systems, which may require periodic rest periods for cooling, typically lasting 3-4 hours. In several embodiments, the energy management system 160 may provide a significant advantage over gasoline-powered counterparts, which face operational interruptions due to fuel depletion. In many embodiments, the object collection apparatus 100 may be self-sufficient in power, eliminating constraints associated with hydraulic or gasoline-powered systems. In some embodiments being self-sufficient in power may provide uninterrupted and eco-friendly operation.

In several embodiments, the towing system 180 of the object collection apparatus 100 is designed for versatile coupling capabilities, accommodating a wide range of towing vehicles 182. In certain aspects, the towing vehicle 182 may include various motorized vehicles such as pickup trucks, all-terrain vehicles (ATVs), sports utility vehicles (SUVs), utility vehicles such as golf carts and side-by-sides, as well as larger vehicles like tractors or trucks of any sort.

In various embodiments, the towing system 180 is not limited to conventional motorized vehicles. In various aspects the towing system 180 may also be compatible with utility animals such as horses, cows, mules, oxen, or water buffaloes, provided they are equipped with a suitable harness or mechanism for attaching the trailer towing assembly 186. In some aspects, the trailer towing assembly 186, which forms a part of the towing system 180, may be designed to connect seamlessly to the trailer hitch 184 of the towing vehicle 182, regardless of whether the towing vehicle is motorized or animal powered.

In other aspects, the inclusion of a jockey wheel 190 in the towing system 180 may further enhance the versatility and ease of maneuvering the object collection apparatus 100 when it is not connected to the towing vehicle 182. In many aspects the jockey wheel 190 may allow for a broader range of towing options and operational flexibility. In several embodiments the adaptability in the towing system 180 may provide an object collection apparatus 100 which may be utilized in various environments and settings. In various aspects, the trailer ball may be a 2-inch trailer ball. In other embodiments, the trailer ball may be any commercially available trailer ball.

In the side view shown in FIG. 1, the support structure 110 of the object collection apparatus 100 is depicted as an L-shape, comprising a horizontal element and a vertical element. Persons having ordinary skill in the art will appreciate that the L-shape depicted in FIG. 1 represents one embodiment, and other configurations and orientations of the vertical element are also contemplated to accommodate different operational requirements and design preferences. Additionally, in certain embodiments, the object retrieval system 120 may be equipped with a top cover and side panels. These additions are designed to enhance the efficiency of object collection by guiding the one or more objects 510 from the object retrieval mechanism onto the stepped transport conveyor 142. In various aspects, the top cover and side panels may act to minimize the escape or dispersion of objects during the collection process.

In addition to the configurations depicted in FIG. 1, persons skilled in the art will appreciate that the stepped transport conveyor system 142 of the object collection apparatus 100 may be configured to include vertical tines across some or nearly the entire stepped transport conveyor 142 surface to enhance object engagement and transport.

In some aspects, the vertical tines may be present instead of the object engaging mechanism 120, including the pickup drum 122 and retrieval tines 124. In other aspects, the vertical tines may be present in addition to the object engaging mechanism 120, including the pickup drum 122 and retrieval tines 124.

Figure 2:
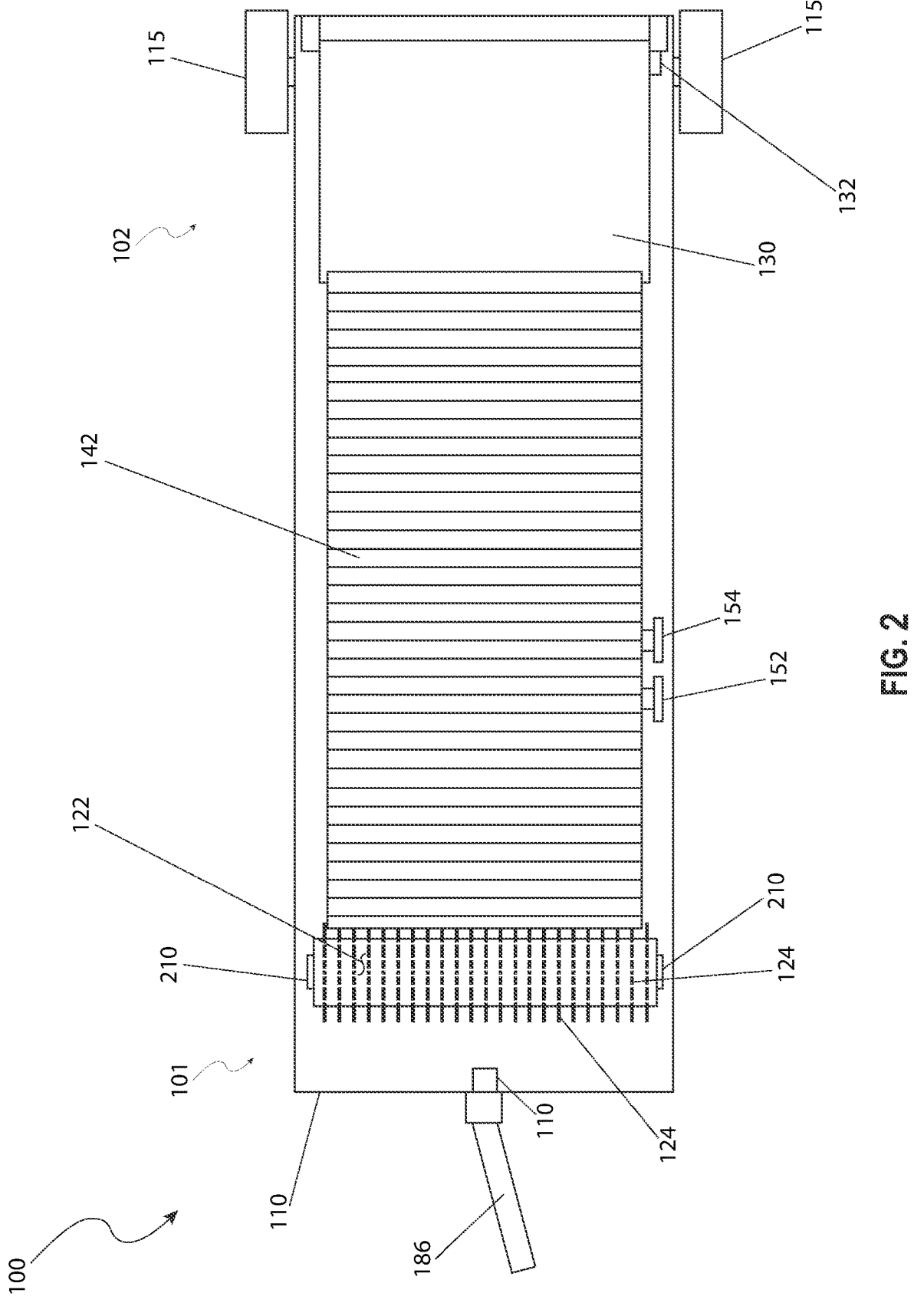
FIG. 2 shows a top view of one embodiment of the object collection apparatus.

FIG. 2 presents a top-down view of the object collection apparatus 100 and shows the arrangement of several components within its structure. In several aspects the trailer towing assembly 186 is depicted, which in many aspects may provide a connection point for the towing vehicle. In some aspects the stepped transport conveyor 142 is shown with vertical lines indicating the presence of features such as stepped and/or ridged and/or cleated surfaces. In certain aspects the stepped and/or ridged and/or cleated surfaces may prevent or substantially prevent the backflow or slippage of one or more objects 510 during their upward transit on the incline. In various aspects the collection receptacle 130 is represented as a prominent feature, with the fill level detection system 132 attached. In other aspects, there may be one wheel 115 at each of the rear corners of the support structure 110.

FIG. 2 includes a photo eye 210. In various aspects, the photo eye 210 may be involved in controlling the height of the pickup drum 122. In some aspects the object collection apparatus 100 may include more than one photo eye 210. In some aspects controlling the height of the pickup drum 122 may allow the object collection apparatus 100 to adapt to different terrains. In certain embodiments controlling the height of the pickup drum 122 may allow for consistent operation. In various aspects the object collection apparatus 100 may include self-leveling capabilities by controlling the height of the pickup drum 122. In various aspects the self-leveling capability may be facilitated by the photo eye 210. In various aspects the photo eye 210 may allow the object collection apparatus 100 to automatically adjust to variations in terrain, such as potholes or uneven ground. In various aspects allowing the object collection apparatus 100 to automatically adjust to variations in terrain may protect the object collection apparatus 100 from potential damage and wear. In several embodiments, manual adjustment options for the object collection apparatus 100 and the pickup drum 122 may be included.

Figure 3:
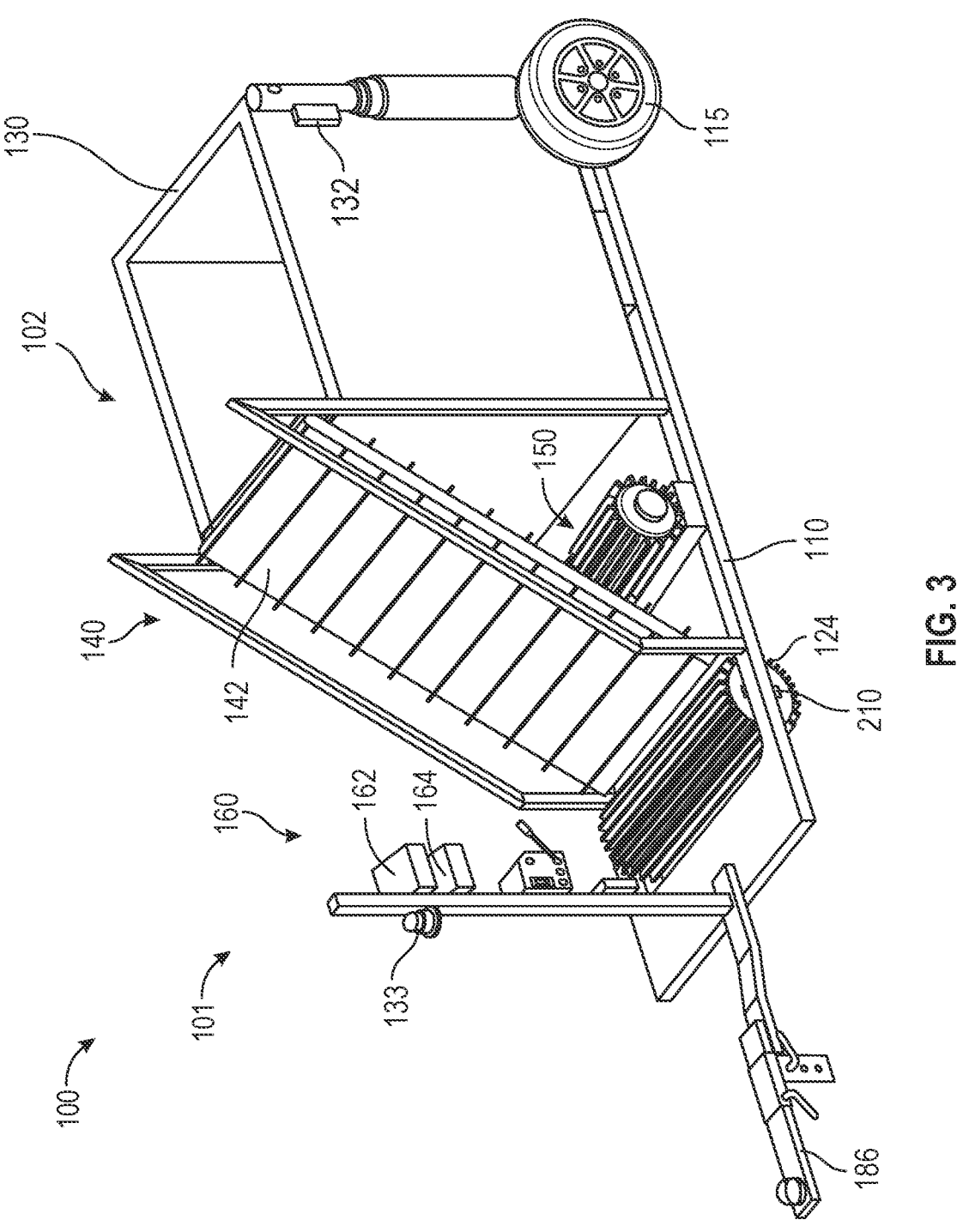
FIG. 3 shows an isometric view of one embodiment of the object collection apparatus.

FIG. 3 presents an isometric view of the object collection apparatus 100, offering a comprehensive perspective that combines elements visible in both FIG. 1 and FIG. 2. In this view, the spatial arrangement and relationship between the various components of the apparatus are more clearly discernible.

In various aspects, the isometric view in FIG. 3 may illustrate the integration of the trailer towing assembly 186 as seen in FIG. 1, demonstrating how it connects to the support structure 110. In certain embodiments the positioning of the retrieval tines 124, the stepped transport conveyor 142 with its distinctive steps and/or ridges, and the collection receptacle 130 with the fill level detection system 132, are depicted in a manner that reflects one embodiment of their operational interplay. In certain embodiments, the isometric view may further emphasize the role of the photo eye 210, as initially introduced in FIG. 2, in maintaining the optimal operational height of the pickup drum.

Figure 4:
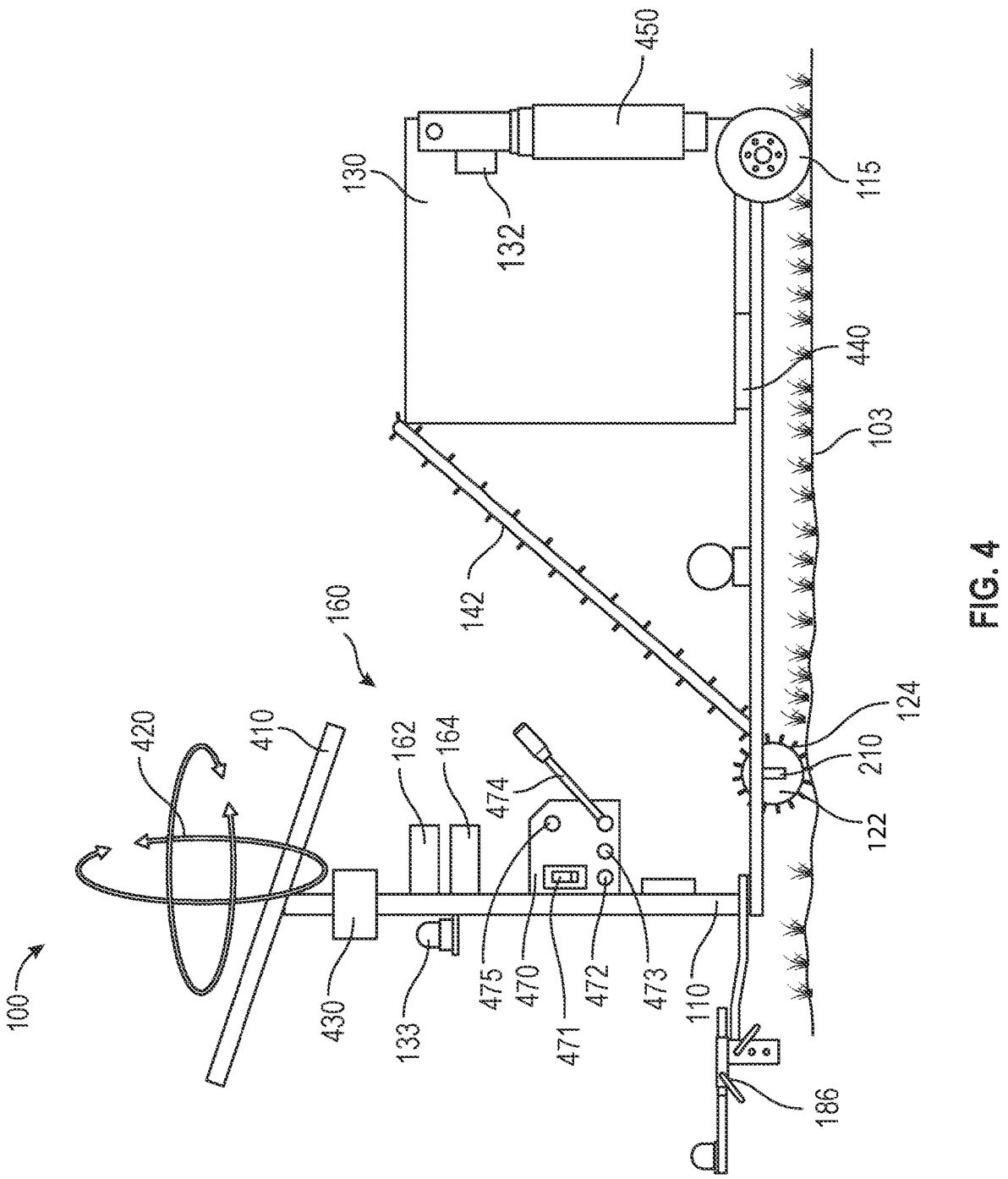
FIG. 4 shows a profile view of one embodiment of the object collection apparatus.

FIG. 4 presents a side view of one embodiment of the present disclosure. In some embodiments the solar panel array 410 may be operatively connected to the upper portion of the support structure 110. In other embodiments the solar panel array 410 may be mounted on the towing vehicle 182. In other embodiments the solar panel array 410 may be mounted elsewhere on the object collection apparatus 100. In various aspects, the solar panel array 410 may be designed to harness solar energy. In certain embodiments the solar panel array 410 may contribute to the energy management system 160 of the object collection apparatus 100. In certain aspects the object collection apparatus 100 may use solar power which may allow the object collection apparatus 100 to be self-powered. In some aspects the object collection apparatus 100 may use solar power which may allow the object collection apparatus 100 to operate independently of external sources of fuel. In other aspects of the present disclosure, the object collection apparatus 100 may use solar power which may allow the object collection apparatus 100 to operate independently of power obtained from the towing vehicle 182.

In several embodiments, the solar panel array 410 in the object collection apparatus 100 may be designed to optimize solar energy capture. In various aspects, the solar panel array 410 may be configured to adjust its orientation to maintain continuous alignment with the sun's rays. In several aspects, the object collection apparatus 100 may incorporate a power point tracking controller 430. In several aspects the power point tracking controller 430 may actively manage the position of the solar panel array 410 to ensure the solar panel array 410 remains perpendicular to the sun's rays throughout its operational cycle. In certain embodiments, the power point tracking controller 430 may actively control the travel path 420 of the solar panel array 410 to maintain optimal solar exposure. In various embodiments the power point tracking controller 430 coupled with the solar panel array 410 may maximize the efficiency of solar energy absorption. In several aspects the coupling the power point tracking controller 430 and the solar panel array 410 and optimizing the travel path 420 may enhance the solar energy harvesting efficiency. In several aspects improvements in energy conversion may fully support the power needs of the object collection apparatus 100.

In certain embodiments, the range of motion provided by the travel path 420 may encompass a significant rotational span. In some aspects the range of motion of the solar panel array 410 as it travels along the travel path 420 provided by the power point tracking controller 430 may include up to 360 degrees rotation in multiple planes of rotation. In certain aspects a full range of movement may allow the solar panel array 410 to track the sun's position effectively, regardless of the time of day or the apparatus's orientation in the environment. In some aspects, this dynamic adjustment of the solar panel array 410 along the travel path 420 may provide consistent solar energy input. In various aspects the adjustment of the position of the solar panel array 410 along the travel path 420 by the power point tracking controller 430 may allow the solar panel array 410 to continuously provide power during extended operations or in varying geographical locations. In various aspects the solar panel array 410 may be replaced by a short circuit or suitable electrical component. In various aspects, the object collection apparatus 100 includes a solar panel array 410 and dedicated alternators which may be cooperatively managed by the energy management system to enhance charging efficiency and extend operational life of the first energy storage unit 162 and the second energy storage unit 164, contributing to an uninterrupted runtime potential under varying operational and environmental conditions.

Included in FIG. 4 is the control interface 470. In several embodiments, the object collection apparatus 100 may feature a control interface 470 designed to facilitate user-friendly operation and precise control of the apparatus's various functions. In various aspects, the control interface 470 may include mechanisms for adjusting operational parameters, such as the speed of different components and the management of the collection receptacle 130.

In certain embodiments, the control interface 470 may include controls that allow independent adjustment of the speed settings for both the object engaging mechanism 120 and the stepped transport conveyor system 140. In some aspects, these controls may include speed control knobs located on the control board, enabling operators to fine-tune the operational speed of the object engaging mechanism 120 and the stepped transport conveyor system 140 for optimal performance. In many aspects this level of control precision may be particularly beneficial in adjusting the apparatus to suit different environmental conditions and types of litter collection tasks.

In certain embodiments the control interface 470 may form the operational hub of the object collection apparatus 100. In some embodiments the control interface 470 may include one or more of a power switch 471, a drum speed control 472 feature, a stepped transport conveyor system speed control 473 feature, a collection receptacle elevation actuator lever 474, a safety interlock override button 475 or combinations thereof.

In certain embodiments the drum speed control 472 feature may be a dial. In certain embodiments the drum speed control 472 feature may be a slider mechanism. In certain embodiments the stepped transport conveyor system speed control 473 feature may be a dial. In certain embodiments the stepped transport conveyor system speed control 473 feature may be a slider mechanism.

In certain aspects, the power switch 471 may activate the object collection apparatus 100. In some aspects the power switch 471 may initiate the operation of various additional features on board the object collection apparatus 100. In certain aspects the power switch 471 may activate the first pneumatic lift mechanism 440. In certain aspects the power switch 471 may activate the second pneumatic lift mechanism 450. In some aspects the power switch 471 may activate both the first pneumatic lift mechanism 440 and the second pneumatic lift mechanism 450. In certain embodiments the power switch 471 may activate the photo eye 210 which may be involved in adjusting the height of the pickup drum 122.

In various aspects the object collection apparatus 100 may include a power switch 471 which may allow the object engaging mechanism to lower during operation and to lift when operation has ended. In various embodiments the object collection apparatus 100 may include more than one power switch 471, wherein one may be used to lower the engaging mechanism during operation, one power switch 471 may be used to raise the engaging mechanism when not in use. In several aspects one power switch 471 may be used where the upward motion or click of the power switch 471 may raise the engaging mechanism, the center position of the power switch 471 may keep the engaging mechanism in a fixed position and a downward motion or click of the power switch 471 may lower the engaging mechanism in preparation for use. In certain aspects the power system may be connected to one or more actuators configured to lower the object engaging mechanism 120 including the retrieval tines 124 for operation and use. In certain aspects, the power system may be connected to one or more actuators configured to raise the object engaging mechanism 120 including the one or more retrieval tines 124 when not in operation or when not in use. In some aspects, the same power system circuit that powers these one or more actuators may also power the object engaging mechanism 120 including the retrieval tines 124.

In several embodiments, the drum speed control 472 feature may allow for precise regulation of the speed of the DC drive drum motor 152. In certain aspects the stepped transport conveyor system speed control 473 feature may allow for the precise regulation of the DC drive belt motor 154.

In various aspects the drum speed control 472 feature may allow the DC drive drum motor 152 to rotate at a speed of greater than 0 m/s (0 miles per hour, mph), greater than 2 m/s, 5 m/s, 10 m/s, 15 m/s, 20 m/s. In various aspects the drum speed control 472 feature may allow the DC drive drum motor 152 to rotate at speeds ranging from approximately about 0 to 5 m/s, 5 to 10 m/s, 10 to 15 m/s, 15 to 20 m/s, greater than 20 m/s. In various aspects the variable operational speed of the DC drive drum motor 152 may allow the object collection apparatus 100 to operate under varying operational conditions and requirements.

In various aspects the stepped transport conveyor system speed control 473 feature may allow the DC drive belt motor 154 to rotate at a speed of greater than 0 m/s (0 miles per hour, mph), greater than 2 m/s, 5 m/s, 10 m/s, 15 m/s, 20 m/s. In various aspects the stepped transport conveyor system speed control 473 feature may allow the DC drive belt motor 154 to rotate at speeds ranging from approximately about 0 to 5 m/s, 5 to 10 m/s, 10 to 15 m/s, 15 to 20 m/s, greater than 20 m/s. In various aspects the variable operational speed of the DC drive belt motor 154 may allow the object collection apparatus 100 to operate under varying operational conditions and requirements.

In various aspects, the collection receptacle elevation actuator lever 474 may be integrated into the control interface 470 of the object collection apparatus 100. In some aspects the collection receptacle elevation actuator lever 474 may provide for manual operation of the collection receptacle 130. In certain aspects, the collection receptacle elevation actuator lever 474 may be utilized for manually raising and tilting the collection receptacle 130 to facilitate the emptying of one or more objects 510. The collection receptacle elevation actuator lever 474 may be ergonomically designed to ensure ease of use and effective operation.

In some aspects a safety interlock override button 475 may be integrated into the control interface 470 of the object collection apparatus 100. In certain aspects the safety interlock override button 475 may provide a safety feature to prevent unintended operation of the collection receptacle elevation actuator lever 474. In some aspects the safety interlock override button 475 may be operated in conjunction with the collection receptacle elevation actuator lever 474 to provide a controlled process of emptying the one or more objects 510 from the collection receptacle 130. In several aspects, this button may serve as a safety mechanism, preventing accidental activation of the receptacle emptying process. In certain embodiments this safety feature may ensure that the emptying process occurs only when intentionally initiated by the operator, adding a layer of security to the operation.

In certain aspects the safety interlock override button 475 may be depressed before operating the collection receptacle elevation actuator lever 474. In some aspects the collection receptacle elevation actuator lever 474 may not operate until the safety interlock override button 475 has been depressed. In several aspects the collection receptacle elevation actuator lever 474 may not operate unless the safety interlock override button 475 is concurrently depressed with the operation of the collection receptacle elevation actuator lever 474. In other aspects the safety interlock override button 475 may be depressed during operation of the collection receptacle elevation actuator lever 474. In certain aspects the safety interlock override button 475, when engaged with the collection receptacle elevation actuator lever 474, may prevent accidental dumping, adding an additional layer of safety and precision to the operation.

In several embodiments, the first pneumatic lift mechanism 440 of the object collection apparatus 100 may be utilized to elevate the position of the collection receptacle 130. In certain aspects, the first pneumatic lift mechanism 440 may operate using pneumatic power to facilitate lifting the collection receptacle 130 and then emptying of one or more objects 510 collected in the collection receptacle 130. In various embodiments, the placement of the first pneumatic lift mechanism 440 on the support structure 110 may assist lifting and balancing the collection receptacle 130 during the emptying process of the collection receptacle 130. FIG. 4 shows one embodiment of the placement of the first pneumatic lift mechanism 440 as being located under the collection receptacle 130.

In several embodiments, the second pneumatic lift mechanism 450 of the object collection apparatus 100 may be utilized to elevate the position of the collection receptacle 130. In certain aspects, the second pneumatic lift mechanism 450 may operate using pneumatic power to lift the collection receptacle 130 and then empty one or more objects 510 collected in the collection receptacle 130. In various embodiments, the placement of the second pneumatic lift mechanism 450 on the support structure 110 may assist lifting and balancing the collection receptacle 130 during the emptying process of the collection receptacle 130. FIG. 4 shows one embodiment of the placement of the second pneumatic lift mechanism 450 as being located proximate to the back end 102 of the collection receptacle 130.

In some embodiments, the second pneumatic lift mechanism 450 may provide additional lifting capabilities in conjunction with the first pneumatic lift mechanism 440 to lift and then empty the collection receptacle 130. In many embodiments, the control of the second pneumatic lift mechanism 450, alongside the first pneumatic lift mechanism 440, may be integrated into the control interface 470 of the object collection apparatus 100.

Figure 5:
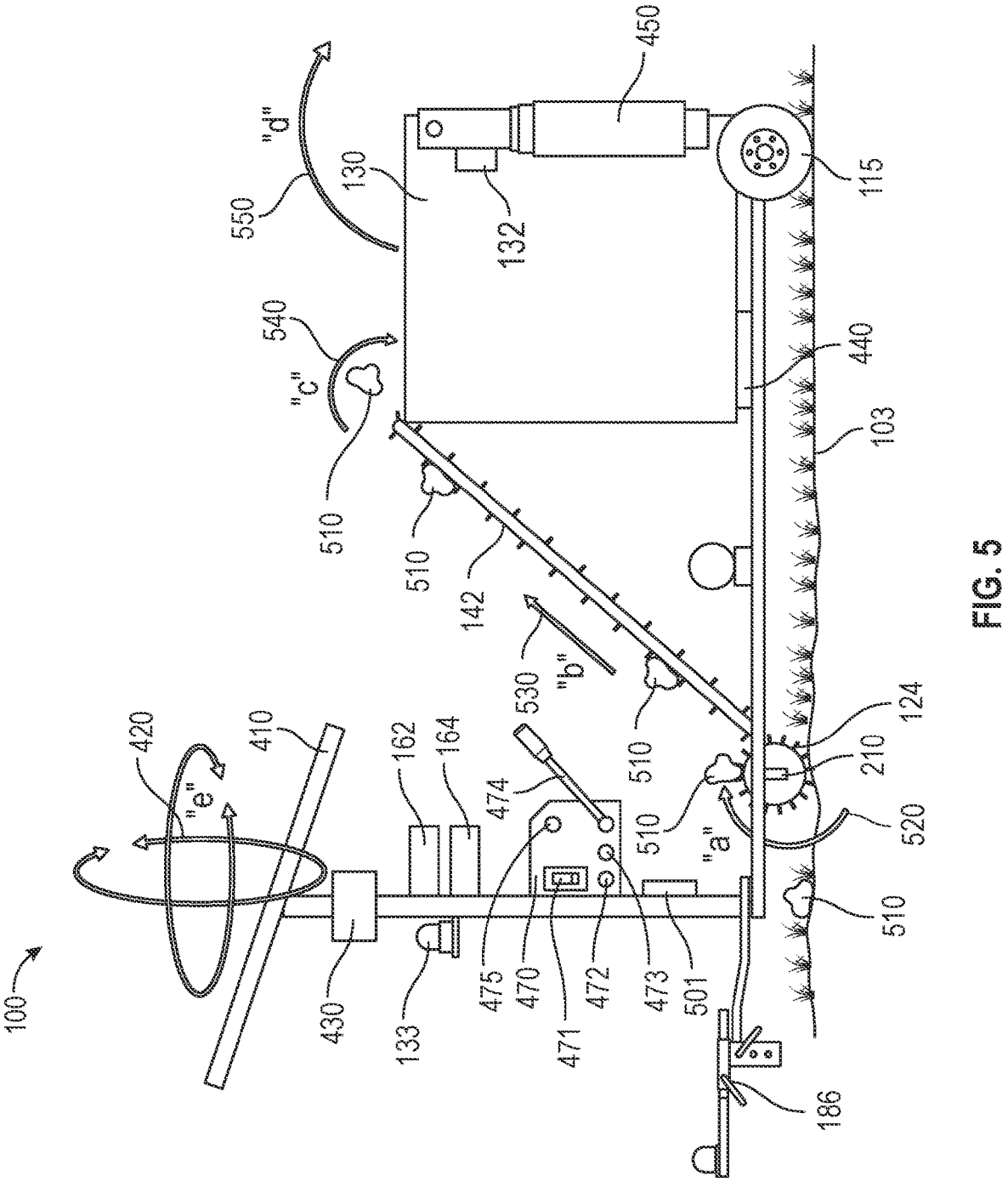
FIG. 5 shows a view of one embodiment of the object collection apparatus during object collection.

In one embodiment, FIG. 5 shows the motion of one or more objects 510 collected during the collection process using of the object collection apparatus 100. In certain aspects, the object engaging mechanism 120, including the retrieval tines 124, may engage one or more objects 510, moving them along a rotating path 520. In certain embodiments this rotating path 520 may be depicted as a clockwise motion, in a reverse direction relative to the direction of travel of the object collection apparatus 100. In some embodiments, an alternative configuration may be presented, where the retrieval tines 124 rotate counterclockwise, corresponding in a forward direction or with the direction of travel of the object collection apparatus 100. In other embodiments, an additional object engaging mechanism 120 may be positioned towards the front end 101 of the apparatus, operating in a counterclockwise motion. In some aspects this supplemental object engaging mechanism 120 may assist in transferring one or more objects 510 to the main object engaging mechanism 120, which, along with the stepped transport conveyor cover 144, may facilitate the movement of objects onto the stepped transport conveyor 142.

In several aspects, the stepped transport conveyor system 140 may include features such as ridges or steps on the stepped transport conveyor 142. These features may maintain the position of one or more objects 510, preventing them from sliding down the incline of the stepped transport conveyor 142.

In many embodiments, the transport path 530 may represent the journey of one or more objects 510 as they ascend the incline of the stepped transport conveyor 142. In some embodiments this path may culminate in the drop path 540, where one or more objects 510 may be deposited into the collection receptacle 130. In certain aspects, the final motion of the objects, as indicated by the dump travel path 550, may illustrate the eventual emptying of the collection receptacle 130, allowing objects to exit the back end 102 of the object collection apparatus 100.

In various embodiments, the multifunctional interface module 501 on the support structure 110 of the object collection apparatus 100 may incorporate capabilities for Bluetooth connectivity, Wi-Fi, remote control operations, and/or provisions for semi-autonomous or fully autonomous navigation systems. In several aspects, this module may be configured to support integration with current and emerging technologies, including communication protocols, IoT compatibility, and/or machine learning algorithms.

Figure 6:
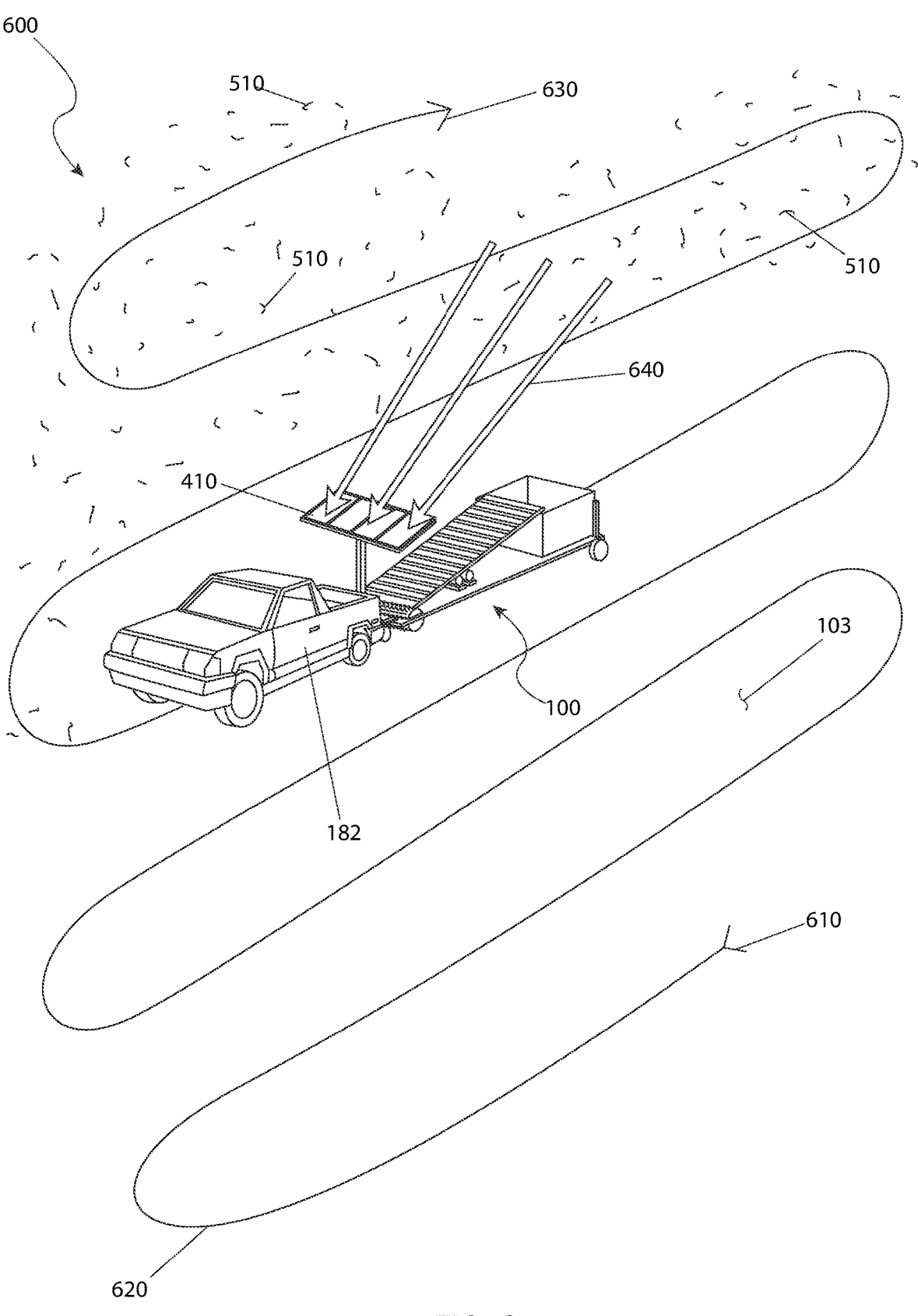
FIG. 6 shows an isometric view of the object collection apparatus during use in a back and forth coverage path.

In various embodiments, FIG. 6 represents the object collection apparatus 100 when coupled with a towing vehicle 182 via a trailer towing assembly 186 and a trailer hitch 184, navigating a controlled pathway 620. In some embodiments the pathway may begin at a start location 610 and end at a finish location 630, with the object collection apparatus 100 providing thorough coverage and effective collection along the controlled pathway 620. In various embodiments, the towing vehicle 182 may be any of a diverse array of vehicles equipped with a hitch system, including but not limited to cars, standard trucks, utility vehicles, all-terrain vehicles, golf carts, tractors, side-by-sides, and even animals such as horses or oxen outfitted with appropriate hitching gear. In certain embodiments the object collection apparatus 100 may be compatible with various towing options.

In several aspects, the operation of the towing vehicle 182 and object collection apparatus 100 along the controlled pathway 620 may demonstrate the apparatus's ability to effectively clear areas of one or more objects 510. This clearance is evidenced by the absence of objects 510 behind the object collection apparatus 100, contrasted with the presence of one or more objects 510 ahead of the object collection apparatus 100 coupled to a towing vehicle 182, marking the apparatus's intended operational path. In certain aspects this efficient cleaning operation may be performed at consistent speeds, allowing for the coverage of significant areas, such as up to eight acres in an hour or approximately sixty-four acres in an eight-hour workday, making the apparatus suitable for extensive cleaning tasks.

In certain embodiments, the depiction of the controlled pathway 620 in FIG. 6, characterized as a curved zig-zag pattern, may demonstrate the object collection apparatus 100's ability to navigate along a varied path. This design feature may facilitate the apparatus's traversal over different surface types.

In some aspects, FIG. 6 shows the role of the solar panel array 410 in powering the object collection apparatus 100. The solar panel array 410 are shown in this embodiment receiving sun rays 640. In various aspects, being powered by a solar panel array 410 may provide an independent and sustainable energy source. In various aspects, independent and sustainable energy sources may eliminate the need for external power from the towing vehicle 182. In various aspects, this feature may enhance the energy efficiency and environmental compatibility of the object collection apparatus 100. In some aspects, this may allow the object collection apparatus 100 to operate independently without relying on fuel sources.

Figure 7:
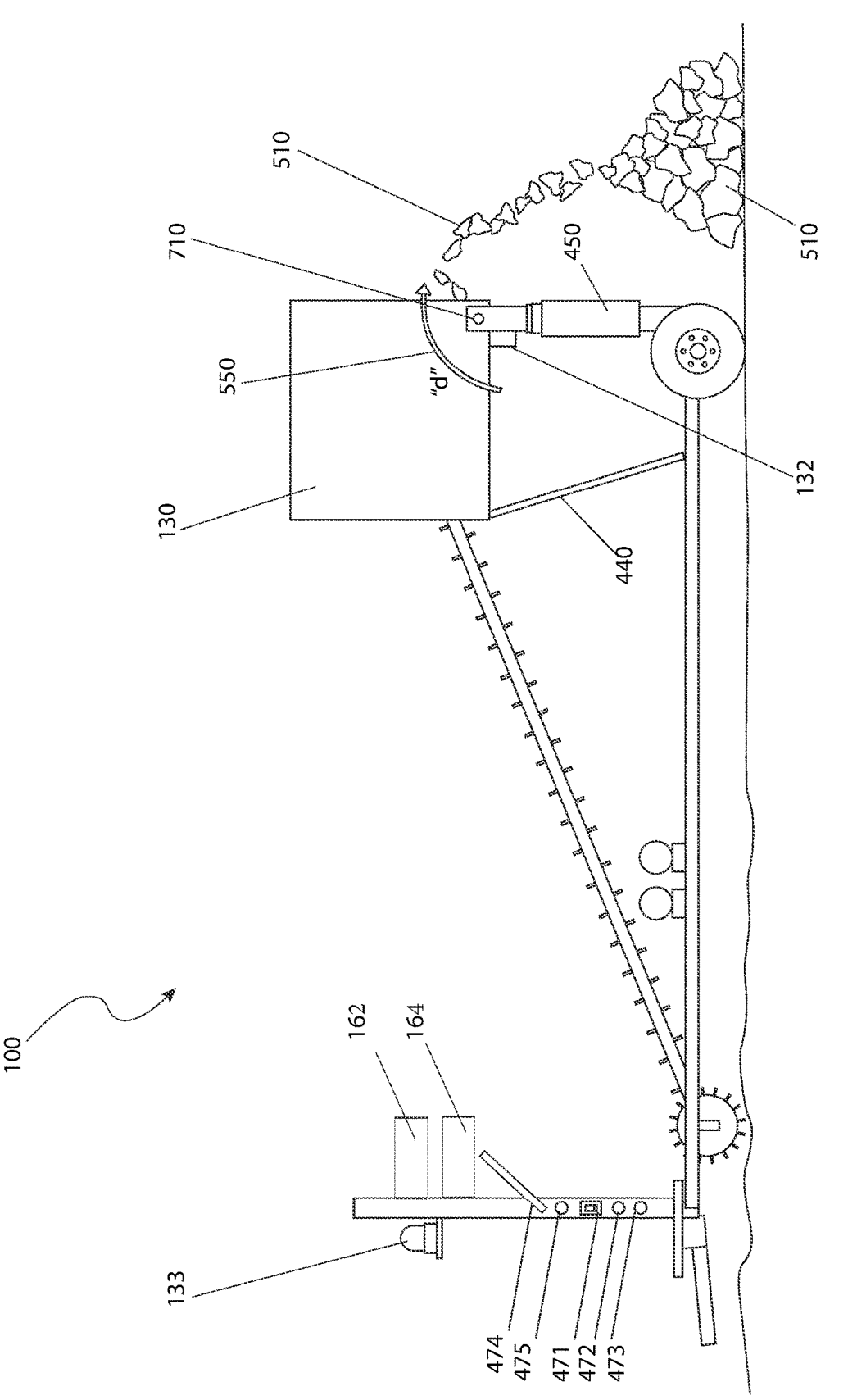
FIG. 7 shows a profile view of one embodiment of the object collection apparatus during collection receptacle emptying.

FIG. 7 depicts several embodiments of the object collection apparatus 100 wherein the first pneumatic lift mechanism 440 and the second pneumatic lift mechanism 450 may assist in the process of emptying the collection receptacle 130. In certain aspects, the first pneumatic lift mechanism 440 may elevate the front end 101 of the collection receptacle 130, while the second pneumatic lift mechanism 450, located at the back end 102 may assist in the rotation of the receptacle around a pivot point 710. In certain aspects this action may result in the efficient disposal of one or more objects 510 along the dump travel path 550.

In certain embodiments, the elevation and tilting of the collection receptacle 130 by the first pneumatic lift mechanism 440 and second pneumatic lift mechanism 450 may lead to the emptying of its contents into a designated disposal area. This could include refuse pickup locations, landfills, or the back of a vehicle functioning as the towing vehicle 182. In some aspects, the second pneumatic lift mechanism 450 may elevate the entire collection receptacle 130 to a height sufficient for emptying into elevated disposal sites, such as dumpsters or dump trucks. In certain embodiments, the second pneumatic lift mechanism 450 may lift the entire collection receptacle 130 to a height of nine feet (9 ft.) to allow dumping into elevated locations such as large dumpsters, dump trucks, and the like.

In certain embodiments, the object collection apparatus 100 may include a multi-system mechanism for the operation of the collection receptacle 130. In various aspects, this mechanism may provide options for pneumatic, electric, and hydraulic systems to facilitate the dumping process for the collection receptacle 130. In some aspects, the pneumatic system may utilize compressed air for actuation. In other aspects, the pneumatic system may utilize electricity for actuation. In other aspects, the pneumatic system may utilize hydraulic alternatives for actuation.

In various embodiments, the electric system of the object collection apparatus 100 may provide a controlled operation for emptying the collection receptacle 130. In various embodiments, the electric system may be designed for precision and may operate with lower noise levels compared to traditional systems. In other embodiments, the hydraulic system may be incorporated for its capability to handle heavy loads and perform under demanding conditions.

In several aspects, the object collection apparatus 100 may allow users to select the most appropriate system—pneumatic, electric, or hydraulic—for the emptying of the collection receptacle 130. In various aspects, this selection may be based on factors such as operational environment, energy efficiency, and the nature of the collected objects.

In various embodiments, the control interface 470, including components such as the power switch 471, drum speed control 472, stepped transport conveyor system speed control 473, collection receptacle elevation actuator lever 474, and safety interlock override button 475, may be positioned on the upper portion of the support structure 110. In other aspects, these control features may be located in different positions on the apparatus 100, offering flexibility in design and accessibility for the operator. In various aspects, the arrangement of the buttons, dials and levers on the object collection apparatus 100 and/or on the support structure 110 and/or on the control interface 470 is not limited by the placement contemplated in any the figures. One of ordinary skill in the art will appreciate that these components may be positioned in various configurations and locations on the object collection apparatus 100 to accommodate different design preferences, operational needs, or user accessibility requirements.

Figure 8:
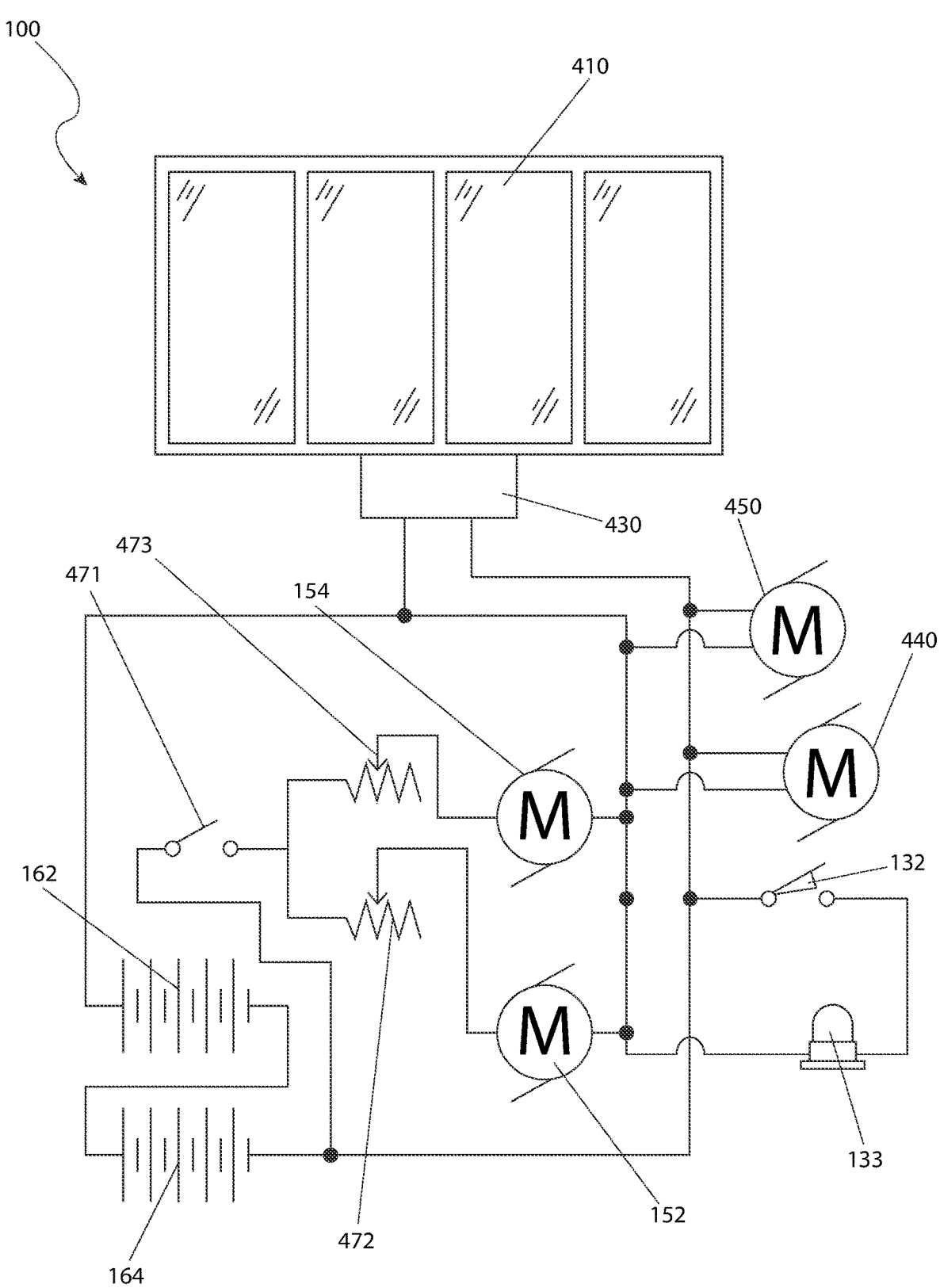
FIG. 8 shows an electrical block diagram of the object collection apparatus.

FIG. 8 presents an electrical block diagram of one embodiment of the electrical system of the present disclosure. The solar panel array 410, in conjunction with the power point tracking controller 430, may harvest electrical energy along the travel path 420. This energy collection process may be depicted in both FIG. 4 and FIG. 5 of the object collection apparatus 100.

In various aspects, the harvested energy may be in the form of direct current (DC) power, which is utilized to charge the first energy storage unit 162 and the second energy storage unit 164. In various aspects, the first energy storage unit 162 and the second energy storage unit 164 may be configured in a twenty-four-volt (24.0 VDC) arrangement. In various aspects this arrangement may provide sufficient electrical power for the operation of the object collection apparatus 100 during daylight hours.

In several embodiments, the direct current (DC) power from the first energy storage unit 162 and the second energy storage unit 164 may operate the pneumatic power system, which in turn may control the first pneumatic lift mechanism 440 and the second pneumatic lift mechanism 450. In various embodiments, the DC power may also be employed to adjust the height of the pickup drum 122 via the photo eye 210.

In some embodiments, the DC power may be directed through the power switch 471, enabling the operation of the DC drive drum motor 152 and the DC drive belt motor 154. In various embodiments, the drum speed control 472 may regulate the speed of the DC drive drum motor 152, while the conveyor belt speed control 473 may adjust the speed of the DC drive belt motor 154. In other aspects the drum speed control 472 and the stepped transport conveyor system speed control 473 may offer a range of speeds, from zero to 35 miles per hour (0-10 mph) and may be individually adjusted based on the specific operational requirements of the object collection apparatus 100. In various aspects, the object collection apparatus may include an energy management system which includes one or more energy storage units configured as rechargeable battery sets, each of the battery sets may be continually charged by a dedicated alternator during operation of the object collection apparatus. In various aspects, the battery sets may further include a power inverter configured to convert direct current (DC) from the battery sets to alternating current (AC). In various aspects, the battery circuit to the motor may utilize a direct current (DC) to DC converter. In some configurations, alternating current (AC) power may be utilized from a local power grid or other AC power source. In various aspects, when traveling at highway speeds, in some aspects, there may be an upper limit such as 33.5 m/s (75 miles per hour) when the object collection apparatus 100 is out of operation. In various aspects, during operation, the object collection apparatus 100 may typically operate at speeds from 0 m/s to 6.7 m/s (0 to 15 mph). In various aspects, it is contemplated that the object collection apparatus 100 may operate at 13 m/s (35 mph) when necessary.

In certain embodiments, the object collection apparatus 100 may be equipped with a wireless communication module. In various embodiments, this module may facilitate remote operation of the apparatus through various communication protocols such as Bluetooth, Wi-Fi, and cellular networks. In various embodiments, the integration of this wireless module may enable operators to control and monitor the apparatus from a distance.

In some aspects, the object collection apparatus 100 may include essential safety features to ensure compliance with transportation standards. In various embodiments, these features may encompass a bumper designed for impact resistance and regulated lighting systems for visibility and safety during operation. In various embodiments, the collection receptacle 130 of the apparatus may be constructed from UV-resistant materials.

In several embodiments, the object collection apparatus 100 may optionally incorporate a navigation system for autonomous or semi-autonomous guidance. In various embodiments, this system may utilize technologies such as GPS data, LIDAR sensors, and camera-based image recognition to navigate and perform object collection tasks. In various embodiments, the autonomous guidance system may enable the apparatus to operate efficiently in diverse environments. In various embodiments, the navigation system and/or the image recognition may allow the object collection apparatus 100 to adjust its path, retrieval tine depth and collection strategy based on real-time data and environmental cues.

In various embodiments, the object collection apparatus 100 may feature a user interface. In various embodiments, this user interface may include a touchscreen display and illumination elements mounted on the support structure 110. In various embodiments, the illumination elements, compliant with safety regulations, may facilitate safe operation in low-light conditions. In various embodiments, the illumination elements may allow the object collection apparatus 100 to remain visible in low light conditions.

In various embodiments, the control interface 470 of the object collection apparatus 100 may comprise independent adjustment mechanisms. In various embodiments, these mechanisms may control the operational speed and pitch of the stepped transport conveyor system 140 and the object engaging mechanism 120. In various embodiments, a dual-action mechanism may be included for the efficient evacuation of contents from the collection receptacle 130. In various embodiments, the control interface may integrate a touchscreen display and may be compatible with remote control functionalities provided by a mobile application.

In various circumstances, litter is collected by hand. In various aspects the present disclosure may be the first roadside litter collecting machine which is designed to meet the United States Department of Transportation's needs regarding the type of machine they desire. In various aspects the present disclosure may have unlimited runtime and may be able to be operated by any type of transportation with a 2" ball hitch along. In other aspects, the present disclosure may be affordable to be mass produced.

In various aspects, the present disclosure may gain control over the world's unsolved litter problem. In other embodiments, the present disclosure may save six times the cost and amount of time relative to conventional litter collection methods such as collecting litter by hand. In various aspects, the present disclosure may keep the world beautiful, prevent diseases, and prevent carbon from decomposing carbon-based litter from entering the atmosphere.

In certain aspects, the machines of the present disclosure may be able to save $9.5 to $11.5 billion dollars per year. In other aspects the present disclosure may be six times faster than collecting litter by hand. In other aspects the present disclosure may save $75,000 relative to other devices currently used. In several aspects the present disclosure may be five times more affordable than other devices currently used, making machines of the present disclosure able to be mass produced. In other aspects, machines of the present disclosure may clean five times the amount of miles per day in same amount time as other devices or methods currently in use. In various aspects, machines of the present disclosure may be able to be operated by many types of transportation methods. In various aspects, machines of the present disclosure may not require being loaded onto a trailer for transport to the jobsite. In various aspects, machines of the present disclosure may have unlimited runtime. In various aspects, machines of the present disclosure may be self-sufficient. In various aspects, machines of the present disclosure may not require any fuel. In various aspects, machines of the present disclosure may solve unmet environmental problems. In various aspects, machines of the present disclosure may include 24 volt, 36 volt, 48 volt, 56 volt, and/or 60 volts power systems. In various aspects, machines of the present disclosure may provide various collecting widths such as two feet, three, feet, four feet, five feet, six feet, seven feet and/or an eight feet wide collection path. In various aspects, machines of the present disclosure may use tractor horsepower converted to electric power to power or fuel the object collection apparatus 100 of the present disclosure.

In various aspects, machines of the present disclosure may be powered by batteries supplemented by an alternator or powered by generators with one or more DC motors and gear boxes if needed. In various aspects, machines of the present disclosure may have a collection brush in various sizes from two feet to eight feet wide which may collect this width in a single pass. In various aspects, machines of the present disclosure may have a stepped or cleated conveyor belt with steps or cleats located thirty-six inches from each other. In various aspects, machines of the present disclosure may have a self-contained collection receptacle 130 that is four cubic yards of holding capacity and able to lift nine feet in the air to accommodate for dumping over the side of a dump truck. In various aspects, machines of the present disclosure may have a flashing light to alarm the operator that collection receptacle 130 needs emptied. In various aspects, the flashing light may be triggered by a high level capacity sensor located on the collection receptacle 130 and/or located in the collection receptacle 130 and/or located near the collection receptacle 130 and/or located in sight of the collection receptacle 130. In various aspects, machines of the present disclosure may have a push button and lever on the control board that the operator pushes in that will raise and then dump the collection receptacle 130. In various aspects, machines of the present disclosure may have two turn dials for controlling speeds from 0-15 mph. In various embodiments, one dial may separately control the brush or one or more retrieval tines 124 speed and the other dial may separately control the stepped transport conveyor 142.

In various aspects, machines of the present disclosure may be constructed of aluminum but may be strong and durable strength. In various aspects, machines of the present disclosure may be constructed from aluminum tubing, aluminum channels, aluminum plates, and other types of stock. In various aspects, machines of the present disclosure may have at least two 12 volt batteries and an alternator with a turn knob dial to control the speed of round collection brush from 0-15 mph. In various aspects, machines of the present disclosure may have at least two 12 volt batteries and an alternator with a turn knob dial to control speed of the speed of the conveyor belt. In various aspects, machines of the present disclosure may have separate controls for the speed of the conveyor belt and the round collection brush. In various aspects, machines of the present disclosure may be able to be operated from inside vehicle. In various aspects, machines of the present disclosure may have self-adjusting leveling system. In various aspects, machines of the present disclosure may allow the collection brush to be lowered into place when it is time to start the litter collection operation. In various aspects, machines of the present disclosure may not have to be transported using a separate trailer to the jobsite. In various aspects, machines of the present disclosure may be able to lift the round collecting brush out of the litter collecting state. In various aspects, machines of the present disclosure may be able to be pulled and travel at speeds of 70 mph.

In various aspects, the disclosure provides a method for collecting objects using an object collection apparatus 100. The steps of the method are shown in FIG. 9. Step one of this method 910 includes the provision of an apparatus equipped with at least one of a support structure 110, an object engaging mechanism 120, a collection receptacle 130, a stepped transport conveyor system 140, an energy management system 160, or a control interface 470. In certain aspects, the apparatus may optionally include an adaptive self-leveling mechanism, a fill level detection system 132, and/or an operator alert system.

Step two of the method 920 may involve towing the object collection apparatus 100 to a designated cleanup site. The towing may be facilitated by any means of transport that includes a standard trailer hitch, such as a towing vehicle 182, capable of engaging with a trailer towing assembly 186 attached to the support structure 110 of the apparatus.

Step three of the method 930 may involve positioning the support structure 110 of the object collection apparatus 100 to extend longitudinally from a front end 101 to a back end 102 along a predetermined controlled pathway 620 collection path. In certain aspects this positioning may allow for effective coverage of the cleanup area.

Step four of the method 940 may include operating the object engaging mechanism 120, which may comprise a pickup drum 122 and retrieval tines 124, to collect one or more objects 510 of varying sizes from an object collection surface 103. The one or more objects 510 may be engaged and lifted from an object collection surface 103 for collection.

Step five of the method 950 may include transporting the one or more objects 510 collected to the collection receptacle 130. In certain aspects of the method, this may be accomplished using the stepped transport conveyor system 140. The stepped transport conveyor system 140 may convey the objects efficiently from the point of engagement to the collection receptacle 130 for storage.

Step six of the method 960 may include managing the power supply to the object collection apparatus 100. In certain aspects this may involve utilizing the energy management system 160. In various aspects this energy management system 160 may control the distribution and usage of power within the object collection apparatus 100. In various embodiments incorporating an energy management system 160 may contribute to efficient operation of the object collection apparatus 100.

Step seven of the method 970 may include adjusting operational parameters of the object collection apparatus 100 via the control interface 470. In various embodiments these adjustments may encompass, but are not limited to, speed settings of the pickup drum 122 and stepped transport conveyor 142 and mechanisms for lifting and emptying the collection receptacle 130.

Step eight of the method 980 may include monitoring the fill level of the collection receptacle 130 utilizing the fill level detection system 132. In various embodiments upon reaching a predefined capacity threshold, an alert may be initiated through the operator alert system, which may comprise a visual indicator 133 such as a flashing light, signaling the need for receptacle emptying.

Step nine of the method 990 may include maintaining operational efficiency on uneven terrain. In various aspects, this may be achieved using an adaptive self-leveling mechanism, if present, within the apparatus. This mechanism may allow for automatic adjustments in response to variations in the terrain. In various aspects a self-leveling mechanism may provide for consistent collection performance.

What is claimed is:

1. An object collection apparatus comprising:
   a. a support structure extending from a front end to a back end, the support structure comprising a composite material and/or a metal alloy, wherein the composite material or metal alloy is characterized by lightness and strength;

b. an object engaging mechanism operatively coupled to the support structure proximate to the front end, wherein the object engaging mechanism is configured to engage objects, and wherein the object engaging mechanism is adjustable in a plurality of configurations and orientations to adapt to various surface conditions;

c. a collection receptacle operatively coupled to the back end of the support structure, wherein the collection receptacle comprises a durable material, and wherein the collection receptacle is configurable in a plurality of capacities to accommodate varying object types and sizes;

d. a stepped transport conveyor system mounted to a middle portion of the support structure, wherein the stepped transport conveyor system is operable by a chain and sprocket system connected to a DC motor or alternatively by any other pulley and belt system suitable for transferring motion to a stepped transport conveyor system and wherein the stepped transport conveyor system is configured to transport collected objects from the object engaging mechanism to the collection receptacle;

e. an energy management system housed within the support structure, the energy management system comprising at least one energy storage unit;

f. a control interface operatively connected to the support structure, the control interface enabling adjustment of operational parameters of the object collection apparatus, including at least one of: speed settings, directional controls, or energy management, and further including mechanisms for lifting and emptying the collection receptacle;

g. a fill level detection system operatively connected to the collection receptacle, wherein the fill level detection system is configured to detect when the collection receptacle reaches a predefined capacity threshold, and to activate an operator alert system; and h. an operator alert system comprising a visual indicator, wherein the visual indicator is a flashing light that is activated by the fill level detection system upon the collection receptacle reaching the predefined capacity threshold, to signal a need for emptying the collection receptacle.

2. The object collection apparatus of claim 1, wherein the composite material comprises a reinforced matrix selected from a group consisting of carbon fiber, glass fiber, aramid fiber, and combinations thereof embedded in a resin matrix.

3. The object collection apparatus of claim 1, wherein the metal alloy comprises aluminum.

4. The object collection apparatus of claim 1, wherein the durable material of the collection receptacle is a high-impact resistant material selected from a group consisting of high-density polyethylene (HDPE), acrylonitrile butadiene styrene (ABS), polycarbonate, steel, stainless steel, aluminum, and hardened plastics and composites that include these materials.

5. The object collection apparatus of claim 1, wherein the collection receptacle is configurable in a plurality of capacities to accommodate different object types and sizes, the capacities ranging from approximately 1 cubic meter to approximately 7.5 cubic meters.

6. The object collection apparatus of claim 1, wherein the object engaging mechanism includes one or more adjustable retrieval tines, the one or more retrieval tines comprising nylon, wherein the one or more adjustable retrieval tines are capable of rotating in a forward direction and/or a reverse direction relative to a direction of travel of the object collection apparatus.

7. The object collection apparatus of claim 1, wherein the energy management system comprises one or more energy storage units configured as rechargeable battery sets, each of the battery sets being continually charged by a dedicated alternator during operation of the object collection apparatus, and further including a power inverter configured to convert direct current (DC) from the battery sets to alternating current (AC).

8. The object collection apparatus of claim 7, wherein the energy management system includes a first energy storage unit dedicated to powering the object engaging mechanism and a second energy storage unit dedicated to powering a stepped transport conveyor system, with each of the first energy storage unit and the second energy storage unit comprising one or more rechargeable 12-volt batteries, and wherein each of the first energy storage unit and the second energy storage unit is charged by its respective alternator or a Power Take-Off (PTO) system integrated with a towing vehicle to facilitate continuous operation of the object collection apparatus.

9. The object collection apparatus of claim 8, wherein the energy management system further includes a solar panel array, the solar panel array being pivotally attached to the support structure to optimize solar energy capture, and is provided with a solar charge controller to manage the charging of the first energy storage unit and the second energy storage unit, thereby providing energy self-sufficiency for extended operational capability.

10. The object collection apparatus of claim 9, wherein the solar panel array and the dedicated alternators are cooperatively managed by the energy management system to enhance charging efficiency and extend operational life of the first energy storage unit and the second energy storage unit, contributing to an uninterrupted runtime potential under varying operational and environmental conditions.

11. The object collection apparatus of claim 1, wherein the support structure is further equipped with a towing assembly operatively connected thereto, the towing assembly comprising a trailer coupler configured for direct engagement with a trailer ball and ball mount of a transport vehicle, thereby facilitating on-road conveyance of the object collection apparatus to and from operational locations without the need for specialized transport equipment.

12. The object collection apparatus of claim 1, wherein the support structure includes a towing assembly enabling the object collection apparatus to perform litter collection operations while traveling at speeds up to 35 mph, and to be transported at highway speeds up to 85 mph when not in operation mode, the towing assembly comprising a trailer coupler configured for direct engagement with a trailer ball and ball mount of a transport vehicle.

13. The object collection apparatus of claim 1, wherein the object collection apparatus is configured to be operable using a variety of power sources, including but not limited to 24 volts, 36 volts, 48 volts, 56 volts, and 60 volts.

14. The object collection apparatus of claim 1, wherein the object engaging mechanism is adjustable and includes one or more adjustable retrieval tines configurable in various widths ranging from 2 feet to 8 feet to provide a selectable path width for collecting objects.

15. The object collection apparatus of claim 1, further comprising a wireless communication module configured to support remote operation through communication protocols, including Bluetooth, Wi-Fi, and cellular networks.

16. The object collection apparatus of claim 1, further comprising safety features including a bumper and lighting, and wherein the collection receptacle is made of UV-resistant materials to enhance durability.

17. The object collection apparatus of claim 1, further comprising a navigation system for autonomous or semi-autonomous guidance, the navigation system utilizing at least one of GPS data, LIDAR sensors, or camera-based image recognition to facilitate object collection operations.

18. The object collection apparatus of claim 1, further including a user interface comprising a touchscreen display and/or illumination elements mounted on the support structure to facilitate user interaction and safe operation in low-light conditions.

* * * * *